United States Patent [19]

Hashimoto

[11] Patent Number: 5,018,006
[45] Date of Patent: May 21, 1991

[54] MULTI-PLATE TYPE IMAGE PICKUP APPARATUS HAVING PICTURE ELEMENTS FOR PRODUCING COLOR AND LUMINANCE SIGNALS

[75] Inventor: Seiji Hashimoto, Yokohama, Japan
[73] Assignee: Canon Kabushiki Kaisha, Tokyo, Japan
[21] Appl. No.: 456,966
[22] Filed: Dec. 26, 1989

Related U.S. Application Data

[62] Division of Ser. No. 290,802, Dec. 23, 1988, Pat. No. 4,907,074.

[30] Foreign Application Priority Data

Oct. 31, 1985 [JP] Japan .............................. 60-242697
Oct. 31, 1985 [JP] Japan .............................. 60-242698
Oct. 31, 1985 [JP] Japan .............................. 60-242699
Oct. 31, 1985 [JP] Japan .............................. 60-242700
Oct. 31, 1985 [JP] Japan .............................. 60-242701

[51] Int. Cl.$^5$ ............................................ H04N 9/07
[52] U.S. Cl. ........................................ 358/44; 358/43
[58] Field of Search ....................... 358/41, 43, 44, 55, 358/75

[56] References Cited

U.S. PATENT DOCUMENTS 4,870,483  9/1989  Nishigaki et al. ................... 358/44
4,907,074  3/1990  Hashimoto .......................... 358/44

FOREIGN PATENT DOCUMENTS 42690   2/1987  Japan .
160195  6/1989  Japan .

Primary Examiner—Howard W. Britton
Assistant Examiner—Kim Yen Vu
Attorney, Agent, or Firm—Fitzpatrick, Cella, Harper & Scinto

[57] ABSTRACT

A multi-plate type image pickup apparatus having solid-state image pickup devices each having a plurality of picture elements for producing color and luminance signals, respectively. The size of at least one of the plurality of picture elements in the image pickup device producing color signals being greater than that of the plurality of picture elements of the image pickup device producing luminance signals.

10 Claims, 19 Drawing Sheets

FIG. 1

|  | $R_1$ | $G_1$ | $B_1$ | $R_1$ | $G_1$ |  |
|---|---|---|---|---|---|---|
| $o_1$ |  |  |  |  |  |  |
|  | $R_2$ | $G_2$ | $B_2$ | $R_2$ | $G_2$ | $e_1$ |
| $o_2$ | $R_3$ | $G_3$ | $B_3$ | $R_3$ | $G_3$ |  |
|  | $R_4$ | $G_4$ | $B_4$ | $R_4$ | $G_4$ | $e_2$ |
| $o_3$ | $R_5$ | $G_5$ | $B_5$ | $R_5$ | $G_5$ |  |

FIG. 2

ODD NUMBER FIELD / EVEN NUMBER FIELD

| | | | | | |
|---|---|---|---|---|---|
| $o_1$ | $n_1$ | R | W | R | W |
| | $n_2$ | W | B | W | B | $e_1$
| $o_2$ | $n_3$ | B | W | B | W |
| | $n_4$ | W | R | W | R | $e_2$
| $o_3$ | $n_5$ | R | W | R | W |
| | $n_6$ | W | B | W | B | $e_3$

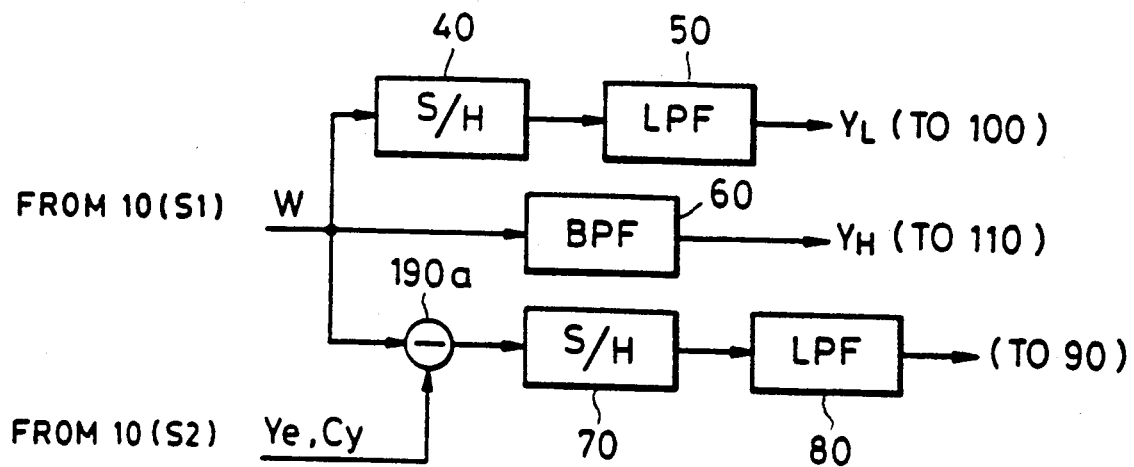

MULTI-PLATE TYPE IMAGE PICKUP APPARATUS HAVING PICTURE ELEMENTS FOR PRODUCING COLOR AND LUMINANCE SIGNALS

This application is a division of application Ser. No. 290,802 filed Dec. 23, 1988, now U.S. Pat. No. 4,907,074 which is a continuation of Ser. No. 920,777 filed on Oct. 20, 1986, now abandoned.

BACKGROUND OF THE INVENTION

1. Field of the Invention

The present invention relates to an image pickup apparatus having an image pickup device such as an inter-line type CCD (referred to as "IL-CCD" hereinafter), an X-Y address-type MOS image sensor, a non-destructive image pickup device (referred to as "NDI" hereinafter), and so forth.

2. Description of the Prior Art

Image-pickup apparatus having a CCD, such as solid-state TV cameras, have been known. In this type of image pickup apparatus, the CCD reads the signals contained in each horizontal line of picture elements constituting an image in an interlaced manner and the thus read signals are delayed by a time corresponding to the period of scanning of one or two such horizontal lines. The delayed signals are utilized in the formation of a luminance signal and color signals, through a vertical correlation processing which makes use of the vertical correlation between the horizontal lines constituting an image.

In another type of image pickup apparatus incorporating a device known as a MOS image sensor, the luminance signals and color signals are obtained through concurrent reading of a plurality of horizontal lines, without the need for any delay line.

These known image pickup apparatus suffer from a disadvantage in that the quality of the reproduced image is impaired by moire and/or false signals due to the fact that the vertical correlative distance is inevitably increased as a result of the interlace scanning In addition, the image pickup apparatus incorporating IL-CCD requires a large-scale peripheral circuit due to the use of numerous delay lines, with the result that the cost of the apparatus is raised undesirably.

It has been proposed to operate the IL-CCD type image pickup apparatus in a specific mode known as "field accumulation mode", in order to reduce the frame after-image. In this case, however, the color reproducibility is impaired due to the use of a modulation-type image pickup system. In addition, the resolution is deteriorated in the vertical direction because the reading output is obtained as an algebraic sum of the charges of two horizontal lines. Furthermore, since the color difference signals are obtained only in accordance with the line sequence, false signals are inevitably formed during summing of the color difference signals due to the differences in the low-band component of the color difference signal and the low-band component of the luminance signal.

These problems will be explained with reference to FIGS. 1 and 2. Referring first to FIG. 1, which shows a typical example of a conventional, striped color separation filter, horizontal scanning lines for constituting an odd number field are represented by o1, o2 and o3, while horizontal scanning lines for forming an even number field are represented by e1, e2 and e3. During the scanning along each horizontal scanning line i, signals $R_i$, $G_i$ and $B_i$ are read, and from the thus read signals, a luminance signal $Y_i$ and color difference signals $R_i-Y_i$ and $B_i-Y_i$ are formed, in accordance with, for example, the following formula:

$$Y_i = 0.3R_i + 0.59G_i + 0.11B_i$$

These color difference signals $R_i-Y_i$ and $B_i-Y_i$ are transmitted and recorded in accordance with line sequential. In this type of filter, however, the resolution is comparatively low in the horizontal direction due to the fact that the pitch or interval of the filter elements of the same color in the horizontal direction is comparatively large, although the generation of false signals is suppressed appreciably. In order to improve the resolution in the horizontal direction, a filter has been proposed in which, as shown in FIG. 2, filter elements of the same color appear at every second picture element in the horizontal direction. The luminance signals and color difference signals obtained through scanning of respective horizontal scanning lines for constituting odd number fields are set on Table 1.

TABLE 1

| Scanning line | Luminance | Color-Dif. line seq. | Summing | Recomposed Signal R | B |
|---|---|---|---|---|---|
| o2 | $Y_3$ | $R_3-Y_3$ | $B_1-Y_1$ | $R_3$ | $B_1+(Y_3-Y_1)$ |
| o3 | $Y_5$ | $B_5-Y_5$ | $R_3-Y_3$ | $R_3+(Y_5-Y_3)$ | $B_5$ |
| o4 | $Y_7$ | $R_7-Y_7$ | $B_5-Y_5$ | $R_7$ | $B_5+(Y_7-Y_5)$ |

In the operation of an image pickup apparatus incorporating a color separation filter of the type shown in FIG. 2, the scanning output obtained through scanning each horizontal line lacks a color difference signal corresponding to the color omitted from a particular horizontal line of color separation filter elements, and a color difference signal obtained from the preceding horizontal scanning line is used in place of the missing signal after suitable vertical correlative processing. In this case, therefore, the signals R and B (G being omitted) recomposed by the summing of the luminance signal and the color difference signal obtained from the preceding horizontal scanning line inevitably involves a false signal attributable to the difference in the luminance between these two horizontal scanning lines, as is the case with the signal B obtained from the horizontal scanning line o2 which includes a term $(Y_3-Y_1)$ corresponding to the difference in the luminance between the horizontal scanning lines o1 and o2.

This problem is attributable to the fact that, due to the interlace scanning method employed in the television system, a vertical correlative distance corresponding to two picture elements in the vertical direction is formed between the color difference signal and the luminance signal which are to be summed for recomposing the color signal.

Another problem encountered with the known solid-state image pickup device is that the sensitivity of the device is limited by the primary color signal, due to the fact that the picture elements for obtaining complementary colors and the picture elements for obtaining primary colors have an equal light-receiving area. In general, the image pickup device exhibits a sensitivity to a primary color transmitted through a primary color filter which is about 3 to 4 times as high as the sensitivity to complementry colors which have passed the total-color transmitting filter. Therefore, if the sensitivity of the image pickup device is optimized for the complementary colors, the device becomes too sensitive to the primary colors. It is therefore not practical to increase the sensitivity unlimitedly.

Still another problem of the known solid-state image pickup device pertains to a difference between the S/N value of the luminance signal and the S/N value of the color signal. The S/N value of the color signal is smaller than that of the luminance signal even when the difference in the bandwidth between these signals is taken into consideration. For instance, assuming here that the luminance signal and the color signal have bandwidths of 4 MHz and 1 MHz, respectively, taking into consideration the bandwidth difference raises the S/N value of the color signal by about 6 dB as compared with the S/N value of the luminance signal, but the S/N value of the color signal is still lower than the S/N value of the luminance signal by about 3 to 5 dB.

A further problem encountered by the known image pickup device pertains to a fluctuation in the dark current in the sensor attributable to a difference in the sensitivity between the picture elements for primary colors and the picture elements for complementary colors. In particular, the fluctuation of the dark current existing in the narrow color signal band cannot be suppressed by the reduction in the difference in sensitivity attained by the restriction of the bandwidth.

A further problem is that the dynamic range of the sensor is undesirably limited due to the difference in the S/N value between the color signal and the luminance signal.

A further problem is that difficulty is encountered in the assembly of image pickup elements, particularly in a multi-plate image pickup apparatus, with regard to attaining sufficiently high precision of alignment of the sensor elements.

SUMMARY OF THE INVENTION

Accordingly, an object of the present invention is to provide an image pickup apparatus having superior resolution in both the horizontal and the vertical directions and which can lower the levels of false signals, thereby overcoming the problems of the prior art.

Another object of the present invention is to provide an image pickup apparatus in which the vertical correlative distance between the luminance signal and the color difference signal is reduced so as to suppress the generation of false signals.

Still another object of the present invention is to provide an image pickup apparatus which exhibits high resolution in both the horizontal and the vertical directions, as well as distinguished color reproducibility with reduced level of false signals.

A further object of the present invention is to provide an image pickup device in which the picture elements for obtaining primary colors are larger than the picture elements for obtaining complementary colors.

A still further object of the present invention is to provide a multi-plate type image pickup apparatus having high sensitivity and resolution.

To these ends, according to a first aspect of the present invention, there is provided an image pickup apparatus comprising: at least one solid-state image pickup device having a plurality of picture elements arranged in the form of a matrix; a color separation filter means provided on the image pickup device and having color-separation filter elements corresponding to and laid on respective picture elements, the filter elements including first filter elements for separating a first color and arranged generally in a checkerboard pattern, and second and third color separation filters for separating second and third colors, respectively, and arranged in line sequence between adjacent first filter elements ("line sequence" as used throughout the specification and the claims, means one after the other, line by line); means for reading information from a plurality of horizontal lines of the picture elements; means for forming a low-band luminance signal for forming a color difference signal, in accordance with the information read from one of the plurality of horizontal lines; and means for forming a high-band luminance signal from the information read from the plurality of horizontal lines.

According to another aspect of the present invention, there is provided an image pickup apparatus having at least one image pickup device provided with a plurality of picture elements arranged in the form of a matrix which provides a plurality of horizontal scanning lines each including a main horizontal line constituted by a horizontal line of the picture elements and another horizontal line (termed a "sub-horizontal line" in the specification and claims), wherein a luminance signal and a color difference signal are formed in accordance with information obtained from a plurality of the horizontal scanning lines, the apparatus comprising: means for forming color signals in accordance with information obtained from the main horizontal line of a first horizontal scanning line and the sub-horizontal line of a second horzontal scanning line adjacent to the main horizontal line.

According to still another aspect of the present invention, there is provided an image pickup apparatus having at least one image pickup device provided with a plurality of picture elements arranged in the form of a matrix which provides a plurality of horizontal scanning lines each including a main horizontal line constituted by a horizontal line of the picture elements and a sub-horizontal line of picture elements, wherein a luminance signal and color signals are formed by making use of vertical correlation between the signals obtained from a plurality of the horizontal scanning lines, comprising: means for forming a low-band luminance signal in accordance with information obtained from the main horizontal line, the low-band luminance signal being used for the formation of a luminance signal and a color difference signal.

According to a further aspect of the present invention, there is provided an image pickup apparatus having at least one image pickup device provided with a plurality of picture elements arranged in the form of a matrix which, provides a plurality of horizontal scanning lines each including a main horizontal line constituted by a horizontal line of the picture elements and a sub-horizontal line of picture elements, wherein a luminance signal and color signals are formed by making use of vertical correlation between the signals obtained from a plurality of the horizontal scanning lines, comprising: means for forming color signals in accordance with information read from respective horizontal lines and forming a low-band luminance signal in accordance with information obtained from a plurality of the main horizontal lines, the low-band luminance signal being used for the formation of a luminance signal and a color difference signal.

According to a still further aspect of the present invention, there is provided a multi-plate type image pickup apparatus having a plurality of solid-state image pickup devices from which color signals and luminance signals are obtained, wherein the size of the picture elements of at least one solid-state image pickup device for producing color signals is greater than that of the picture elements of the solid-stage image pickup devices for producing luminance signals.

In the image pickup apparatus according to a first aspect of the present invention, the generation of moire, as well as generation of false signals in the color difference signals, is remarkably well suppressed, so as to ensure a high resolution.

Furthermore, since the color difference line sequential signals are derived from horizontal lines from which also the low-band luminance signals are formed both for the odd-numbered fields and even-numbered fields, the application of a color separation filter to electronic still cameras is very much facilitated.

In the image pickup apparatus of a second aspect of the present invention, color signals are formed in accordance with information obtained from the main horizontal line of a first horizontal scanning line and the sub-horizontal line of a second horizontal scanning line adjacent to the main horizontal line. With this arrangement, the vertical correlative distance between the line sequential color difference signal and the low-band luminance signal is reduced so that the generation of false color signals due to the difference in the luminance is remarkably well suppressed.

In the image pickup apparatus of a third aspect of the invention, a low-band luminance signal, which is used for the purpose of formation of a luminance signal and color difference signal, is formed in accordance with information obtained from the main horizontal line. This arrangement effectively suppresses the formation of false signals attributable to difference in the luminance.

In the image pickup apparatus of a fourth aspect of the invention, color signals are formed in accordance with information obtained from respective horizontal lines, and a low-band luminance signal, which is used for the purpose of forming a luminance signal and a color difference signal, is formed in accordance with information obtained from a plurality of the main horizontal lines. With this arrangement, it is possible to prevent line crawl and, hence, false signals within the image band.

In a specific embodiment of the image pickup apparatus of the present invention, a solid-stage image pickup device has primary-color picture elements for producing signals corresponding to primary colors and complementary color picture elements for producing signals corresponding to complementary colors, the primary-color picture elements having a greater size and, hence, a greater light-receiving area than the complementary color picture elements, so as to eliminate problems attributable to the difference between the sensitivity to the primary colors and the sensitivity to the complementary colors.

According to a fifth aspect of the present invention, different solid-state image pickup devices have different sizes of picture elements, so as to enable the sensitivities of image pickup devices to be optimized both for luminance and for colors.

These and other objects, features and advantages of the present invention will become clear from the following description of the preferred embodiments taken in conjunction with the accompanying drawings.

BRIEF DESCRIPTION OF THE DRAWINGS

FIG. 1 is an illustration of arrangement of filter elements in a typical conventional color separation filter;

FIG. 2 is an illustration of arrangement of filter elements in an improved color separation filter;

FIG. 6(a) is an illustration of a color separation filter incorporated in a second embodiment of the image pickup apparatus of the present invention;

FIG. 6(b) is an illustration of a color separation filter incorporated in a third embodiment of the image pickup apparatus of the present invention;

FIG. 7 is a block diagram of a signal processing circuit constituting an essential portion of the second embodiment;

DESCRIPTION OF THE PREFERRED EMBODIMENTS

Preferred embodiments of the image pickup apparatus of the invention, which incorporate NDIs as the image pickup devices and which are intended for picking up still images, will be explained hereinafter. As to the details of the NDI, reference is made to, for example, Japanese Patent Laid-Open No. 12764/1985, which discloses a typical example of such an NDI.

A first embodiment of the image pickup apparatus of the invention incorporates an image pickup device having a color separation filter of the same type as that shown in FIG. 2 explained above in connection with the background of the invention. Referring to FIG. 2, the image pickup device has a color separation filter with a plurality of filter elements disposed on picture elements arranged in the form of a matrix having a plurality of horizontal lines n1 to n6 of the picture elements. Symbols o1, o2 and o3 show horizontal scanning lines for constituting an odd-numbered field. It will be seen that, during the scanning along the horizontal scanning line o1, the information carried by the horizontal line n1 and the information carried by the horizontal line n2 are read and processed simultaneously so that a luminance signal and color signals are formed. Similarly, horizontal scanning lines for forming an even-numbered field are represented by e1, e2 and e3. Throughout the specification and claims, the term "horizontal scanning line" is used to mean a single horizontal scanning line of a standard television system such as NTSC, PAL and SECAM, while the term "horizontal line" is used to mean each horizontal line of picture elements. In this embodiment, total-color transmitting filter elements W are arranged on every second picture element in the line and column directions. In some of the horizontal lines, filter elements R for transmitting red color are arranged in alternation with the total-color filter elements W, while, in other horizontal lines, filter elements B for separating blue color are arranged in alternation with the filter elements W. In other words, the color separation filter has horizontal lines of a first type in which the filter elements R and W appear alternatingly and horizontal lines of a second type in which the filter elements B and W appear alternatingly, and horizontal lines of the first type and horizontal lines of the second type appear in alternation in the vertical, or column, direction.

In this embodiment, by virtue of the simultaneous processing of signals obtained from two horizontal lines and the specific arrangement of filter elements explained above, a luminance signal is derived from W signals of two horizontal lines and color difference signals are formed from color signals and W signals of respective horizontal lines in a manner which will be explained hereinafter.

Figure 3:
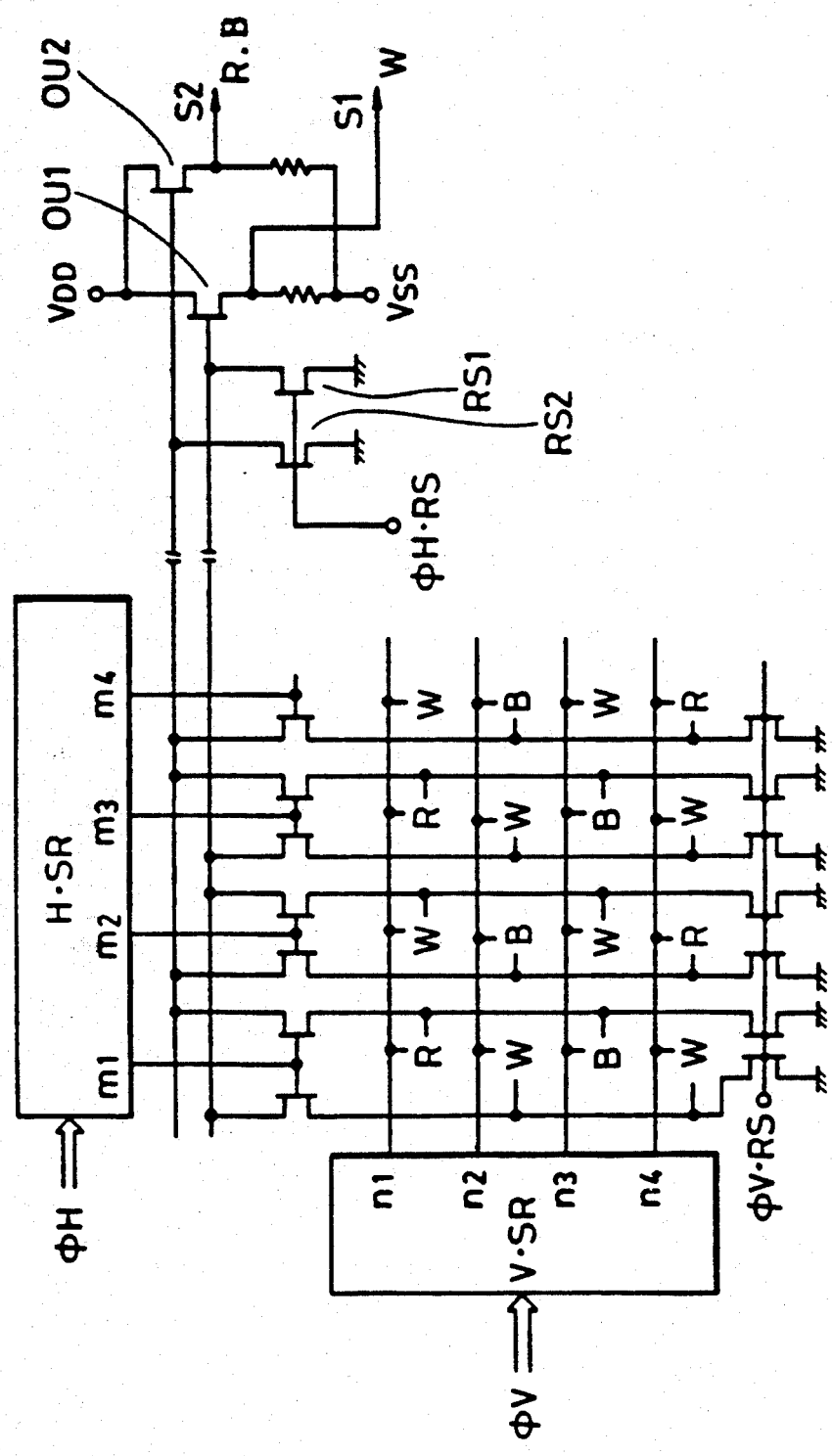
FIG. 3 is a schematic illustration of an NDI used as an image pickup device in a first embodiment of the image pickup apparatus of the present invention, showing also a circuit for driving the NDI.

Referring to FIG. 3, schematically illustrating an NDI, color separation filter elements R, B and W are disposed on respective picture elements. These filter elements are connected to a vertical shift register V.SR and to a horizontal shift register H.SR as illustrated. Symbols $\phi$V.RS and $\phi$H.RS represent, respectively, charge refresh pulses for the respective bits in the vertical and horizontal directions, while $\phi$H and $\phi$V represent, respectively, shift pulses of shift registers H.SR and V.SR. Symbols $V_{DD}$ and $V_{SS}$ represent, respectively, reference potentials, while S1 and S2 represent outputs.

In operation, as two horizontal lines are read simultaneously, color signals R and B are derived for alternating picture elements from the output S2, while the output S1 delivers a color signal W consecutively for successive picture elements.

More specifically, as a shift pulse $\phi$V is applied to the shift register V.SR during each horizontal blanking, the potentials of two adjacent output terminals amongst the output terminals n1 to n4 are raised to high level and, as another shift pulse $\phi$V is applied, the potentials of two adjacent output terminals which are spaced from the first-mentioned two terminals by two output terminals are raised. Thus, signals of two adjacent horizontal lines are picked up during scanning along each horizontal scanning line.

As the potentials of two adjacent lines are successively raised to the high level during successive horizontal scannings, the signals carried by two picture elements of two horizontal lines selected by the vertical shift register V.SR are successively read for each horizontal shift pulse $\phi$H, and the thus read out signals are output through the outputs S1 and S2 via respective output amplifiers OU1 and OU2.

Reset transistors RS1 and RS2 are adapted to reset the output amplifiers OU1 and OU2 immediately after the reading of signals therefrom, in response to each horizontal shift pulse $\phi$H.

Figure 4:
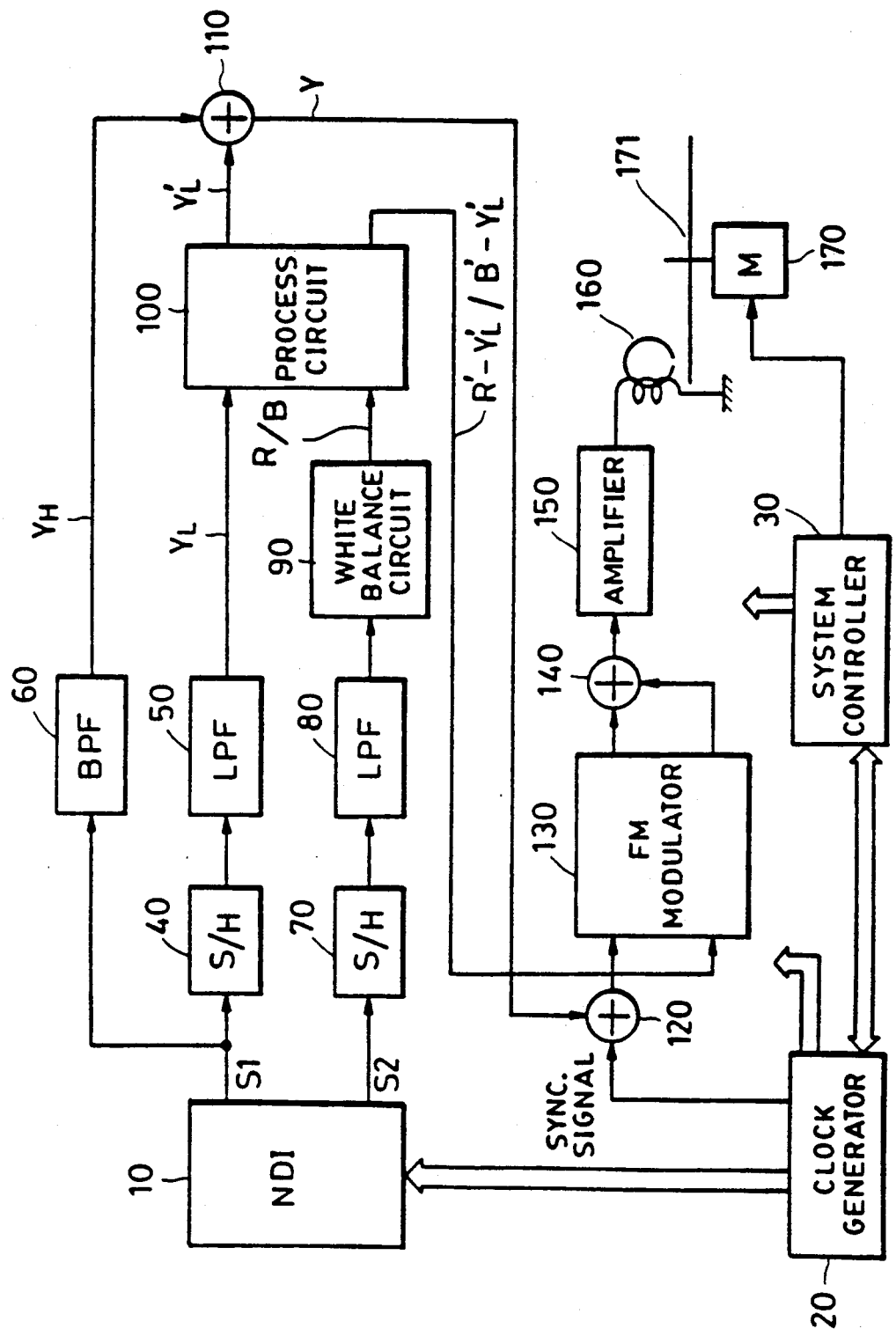
FIG. 4 is a block diagram of a signal processing circuit incorporated in the NDI shown in FIG. 4.
Figure 5:
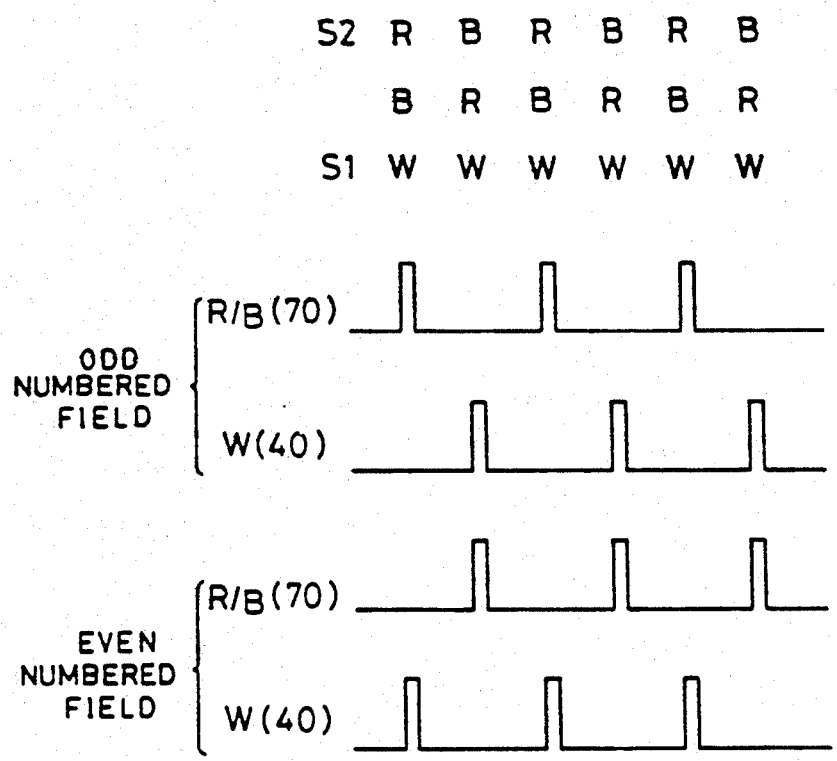
FIG. 5 is a waveform chart showing timing of output signal and sample timing in the circuitry shown in FIG. 3.

FIG. 4 is a block diagram of an example of a signal processing circuit making use of the NDI shown in FIG. 3, while FIG. 5 is a waveform chart showing the timing of signals read out from the NDI and the sample timings in sample and hold circuits 40 and 70 which are incorporated in the signal processing circuit.

Referring first to FIG. 4, the signal processing circuit has an NDI 10, a clock generator 20, a system controller 30, the sample and hold circuits (S/H) 40 and 70, low-pass filters (LPF) 50 and 80, band-pass filter (BPF) 60, a white balance circuit 90, a process circuit 100, adders 110, 120 and 140, a frequency modulator (FM) 130, an amplifier 150, a magnetic head 160 capable of performing at least recording, and a motor 170 for driving a recording medium 171.

In operation, as two adjacent horizontal lines are read simultaneously, the output terminal S1 of the NDI 10 produces the W signals in dot-sequential from alternating ones of these two horizontal lines, while the output terminal S2 delivers alternatingly dot-sequential signals of R, B and dot-sequential signals of B, R for each horizontal scanning line. The luminance signal is formed from the W signal derived from the output terminal S1. More specifically, the output from the terminal S1 of the NDI is used as it is as the high-band luminance signal, thus attaining a band of a high resolution. More specifically, assuming that each horizontal line of picture elements in the NDI 10 contains 510 picture elements, the frequency of reading of the W signal from the terminal S1 is calculated to be about 9.5 MHz. Using this frequency as the Nyquist frequency, it is possible to utilize the band up to about 4.7 MHz as the luminance band. In such a case, the band-pass filter 60 has a band-pass characteristic of about 1 MHz to 4.7 MHz.

On the other hand, the low-band components for luminance and color difference, as well as the color signals, are separated from the outputs at the output terminals S1 and S2 by the sample and hold circuits 40 and 70. More specifically, referring to FIGS. 2 and 5, during the scanning along the horizontal scanning line o1, the W signals corresponding to the horizontal line n1 are sampled and held by the sample and hold circuit 40 at a timing illustrated in FIG. 5 and are delivered as a low-band luminance signal $Y_L$ to the process circuit. On the other hand, the color signal is formed only from the signals derived from the horizontal line n1, during scanning along the horizontal scanning line o1.

These points constitute one of the critical features of this embodiment. Thus, in this embodiment, the color signal R derived from the horizontal line from which the low-band luminance signal $Y_L$ is extracted is sampled and held at a timing as shown in FIG. 5, so as to be used as the color signal peculiar to the instant horizontal scanning line.

The low-band luminance signal $Y_L$ and the color signal thus obtained are input to the process circuit which forms a color difference signal. Similarly, in the horizontal scanning along the horizontal scanning line o2, the low-band luminance signal $Y_L$ and the color signal B are obtained from the horizontal line n3, so that a color difference signal $B-Y_L$ is obtained.

Referring to another field, which is the even-numbered field in this case, a color difference is formed from the low-band luminance signal $Y_L$ and the color signal B extracted from the horizontal line n2 during scanning along the horizontal scanning line e1, while, during the scanning along the horizontal scanning line e2, the color difference signal is formed from the low-band luminance signal $Y_L$ and the color signal R which are derived from the horizontal line n4.

It will be seen that the vertical correlative distance between two interlacing groups of signals for different fields is so small that a high resolution is obtained in the vertical direction with regard to the low-band luminance signal $Y_L$ and the color component.

On the other hand, a remarkably high horizontal resolution is obtained in regard to the high-band luminance signal $Y_H$, because this signal is composed from the signals obtained from two horizontal lines.

Referring again to FIG. 4, the low-band luminance signal and the color signal thus obtained are introduced into the low-pass filters 50 and 80, so that their band widths are restricted to less than 1 MHz. The color signal is then delivered to the white balance circuit 90, in which a white balancing operation is conducted in accordance with a control voltage (not shown) which is controlled in accordance with the line sequence. The white-balanced line sequential color signals R and B and the low-band luminance signal $Y_L$ are delivered to the process circuit 100, in which a $\gamma$ conversion is conducted, and, after a predetermined processing, a low-band luminance signal $Y_L'$ and line sequential color difference signal $R'-Y_L'$ or $B'-Y_L'$ are output. The low-band luminance signal $Y_L'$ is added to the high-band luminance signal $Y_H$ by the adder 110, so that a luminance signal Y is formed. The luminance signal Y is added to the synchronizing signal in the adder 120 and is delivered to the FM modulator 130 which also receives the line sequential color difference signal. The modulator 130 modulates these signals with different carriers, and the modulated signals are added to each other by the adder 140, the output of which is delivered through the amplifier 150 and the head 160 so as to be recorded in the recording medium 171 by the head 160.

As will be understood from the foregoing description, the first embodiment of the present invention offers various advantages such as high resolution due to the fact that the high-band luminance signal is derived from two horizontal lines, as well as reduced moire, thanks to the small vertical correlative distance.

The vertical resolution also is improved because the low-band luminance signal is obtained from a single horizontal line. The color difference signal, which also is derived from a single horizontal line, involves only a very small false signal component. It is to be noted also that a color separation filter having the described filter elements is suitable for use in an electronic still camera, because the color difference line sequential signals are derived from the horizontal lines from which the low-band luminance signals are obtained for both the even- and the odd-numbered fields.

Furthermore, when a non-destructive reading sensor such as an NDI is used as the image pickup device in the pickup of an image formed by a single shooting exposure performed by means of a photographic shutter, it is possible to obtain a frame image suffering from no flicker, because the same signals are read and processed repeatedly as a result of the successive reading of the odd- and even-numbered fields.

FIG. 6(a) shows a color separation filter which is incorporated in the second preferred embodiment of the image pickup apparatus of the present invention.

This color separation filter is substantially the same as that shown in FIG. 2 except that Ye and Cy filter elements are used in place of the R and B filter elements. With this color separation filter, the signal B is obtained by subtracting the signal Ye from the signal W, while the signal R is obtained by substracting the signal Cy from the signal W. This operation is performed by a signal processing circuit shown in FIG. 7, which is obtained by adding a subtractor 190a to the input side of the sample and hold circuit 70 of the signal processing circuit of FIG. 4. More specifically, the high-band luminance signal $Y_H$ and the low-band luminance signal $Y_L$ are obtained from the W signal from the output S1 of the NDI 10, as in the case of the arrangement shown in FIG. 5, whereas the color signals R and B are obtained by subtracting the signals Ye and Cy obtained at the output S2 from the W signal obtained at the output S1.

This second embodiment offers the advantage that the transmittance is improved so as to ensure a high sensitivity as compared with the first embodiment, thanks to the use of the complementary color filter elements Ye and Cy. The use of the complementary color filter elements also improves the MTF (Modulation Transfer Function) in the vertical direction, so that the generation of moire is suppressed remarkably.

Figure 8:
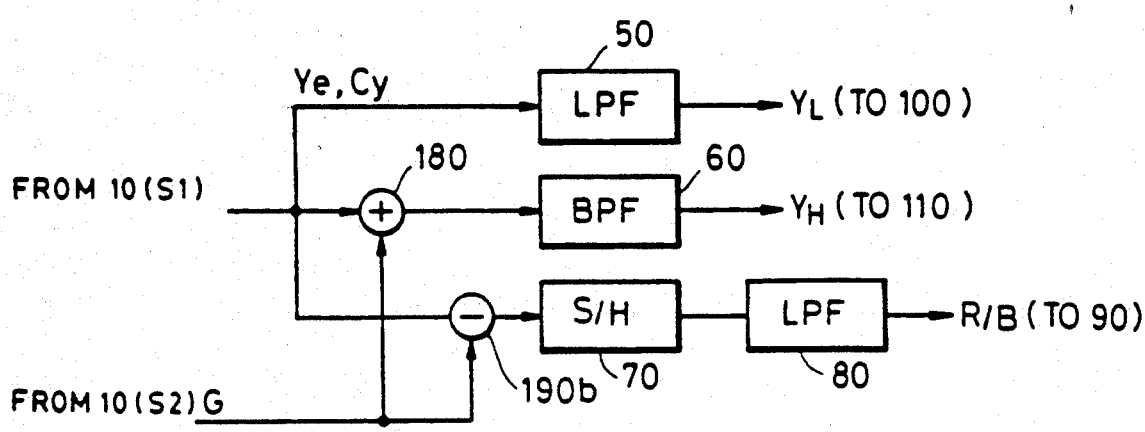
FIG. 8 is a block diagram of a signal processing circuit constituting an essential portion of the third embodiment.

FIG. 6(b) shows a third embodiment of the invention in which the R and B filter elements in the color separation filter shown in FIG. 2 are substituted by G filter elements, while Cy or Ye filter elements are used in place of the W filter elements in the color separation filter shown in FIG. 2. The arrangement is such that there are two types of horizontal lines, namely, horizontal lines of a first type, constituted of the Cy and G filter elements, and the horizontal lines of a second type, constituted of the Ye and G filter elements, and such that horizontal lines of the first type and horizontal lines of the second type appear in alternation in the vertical direction. In this case, the R signal is obtained by subtracting the G signal from the Ye signal, while the B signal is obtained by subtracting the G signal from the Cy signal. FIG. 8 shows a signal processing circuit suitable for use in this embodiment. The subtracting operations for obtaining the R and B signals are conducted by a subtractor 190b. The high-band luminance signal $Y_H$ is formed by an adder 180 which forms the sum of the signals derived from two horizontal lines, while the low-band luminance component $Y_L$ is approximated by the low-band components of the dot-sequential signals of Ye and Cy.

Figure 9:
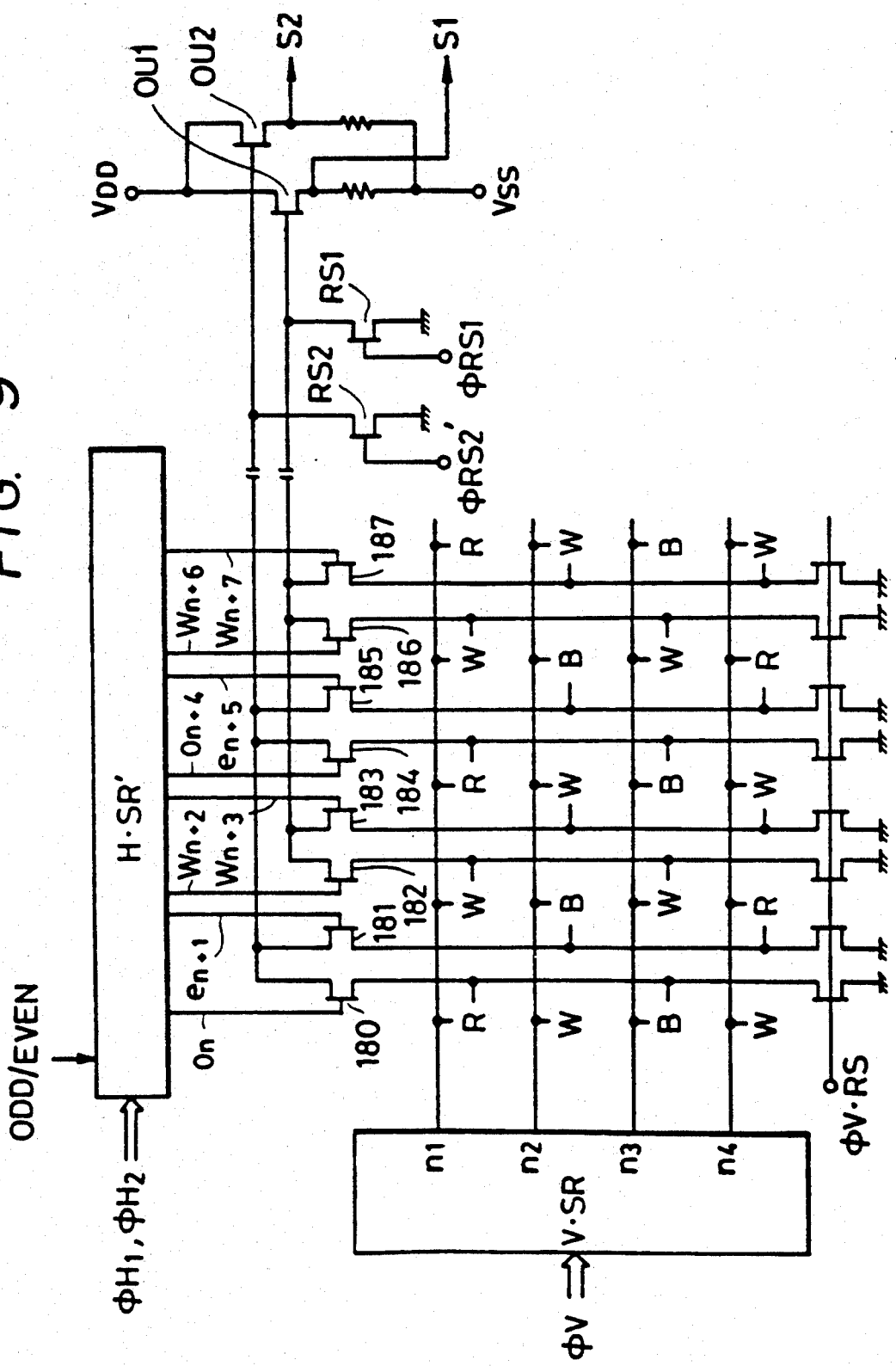
FIG. 9 is a schematic illustration of an NDI used as an image pickup device incorporated in a fourth embodiment of the image pickup apparatus of the present invention, showing also a circuit for driving the NDI.
Figure 10:
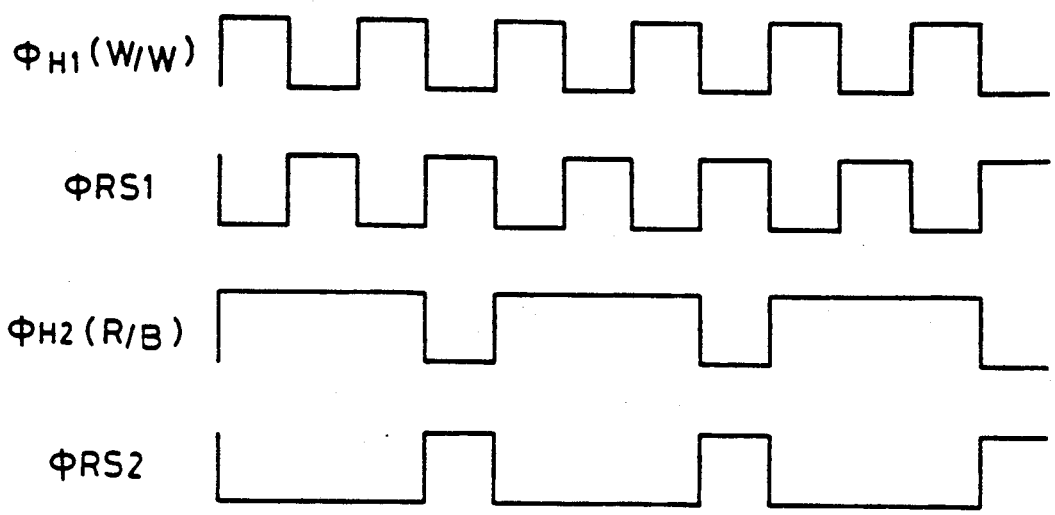
FIG. 10 is a waveform chart illustrating timings of pulses obtained in the fourth embodiment.

FIG. 9 shows a fourth preferred embodiment of the present invention. The signal output lines of the NDI used in this embodiment are connected in a manner which is different from that shown in FIG. 3. Namely, the W signals from two horizontal lines are derived from the output S1 of the NDI, whereas the color signals are obtained, in the case of odd-numbered fields for example, by turning off horizontal switches 181 and 185 corresponding to the even-numbered horizontal lines. A detailed description will be made below as to the timing of the driving pulses for driving the horizontal shift register H.SR of the NDI shown in FIG. 9, with specific reference to FIG. 10. In the latter Figure, a symbol $\phi H_1$ (W/W) represents the driving pulse for $W_n$, while $\phi RS1$ represents the refresh pulse for the output terminal S1 (W/W) in bit units. On the other hand, a symbol $\phi H_2$ (R/B) represents the driving pulse for $o_n$ and $e_n$ which repeats at a frequency equal to ½ of the frequency of the driving pulse $\phi H_1$(W/W). It will be seen that the switching is conducted for every two picture elements in the horizontal direction. The refresh pulses $\phi RS_2$ also have a frequency equal to ½ of the frequency of the pulses $\phi H_1$(W/W). As stated before, during the scanning for forming an odd-numbered field, driving pulses are applied to the vertical line $o_n$, while the line $e_n$ is turned off. The driving condition is reversed during the scanning for the formation of an even-numbered field.

With this arrangement, color signals R and B are derived in line sequence from the output terminal S2 of the NDI for each horizontal scanning line, so that the color separation sample and hold circuit 70 shown in FIG. 4 can be omitted.

Figure 11:
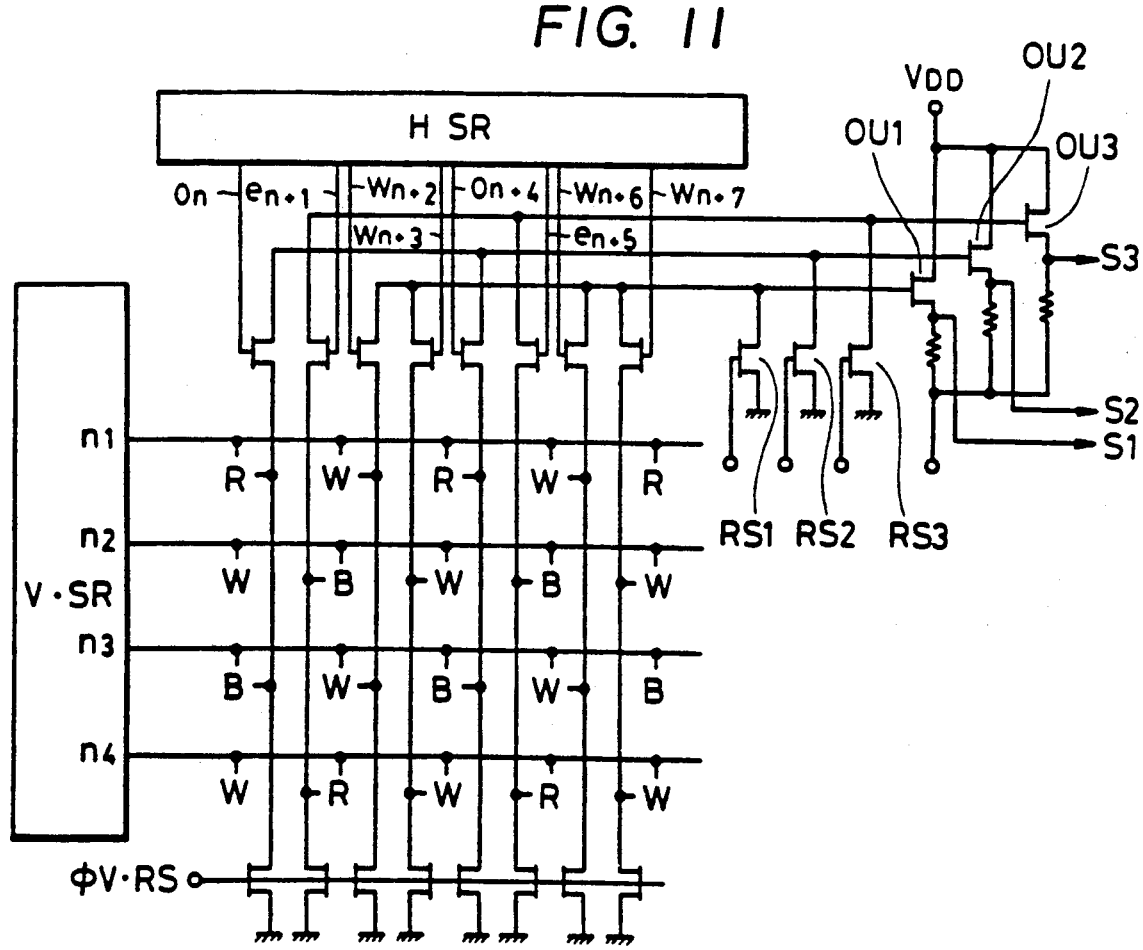
FIG. 11 is a schematic illustration of an NDI used as an image pickup device in a fifth embodiment of the image pickup apparatus of the present invention, showing also a circuit for driving the NDI.

FIG. 11 schematically, shows an NDI which is used in a fifth preferred embodiment of the invention. In this NDI, the lines concerning the W signal are arranged in the same manner as that shown in FIG. 9, while the connection of color signal output lines is altered from that shown in FIG. 9. Namely, in this embodiment, separate output lines S2 and S3 are used for the color output signals for the odd-numbered fields and for the color output signals for the even-numbered fields, respectively. When two horizontal lines are read simultaneously, the R and B signals derived from both horizontal lines are separated such that, for example, the R signals are derived from the output line S2, while the B signals are derived from the output line S3.

The circuit shown in FIG. 11 incorporates output amplifiers OU1 to OU3 and reset transistors RS1 to RS3. The arrangement shown in FIG. 11 is different from that shown in FIG. 9 in that the R or B picture elements of the adjacent horizontal lines are connected to different output lines and the R or B picture elements of every other horizontal lines are connected to the same output line.

Figure 12:
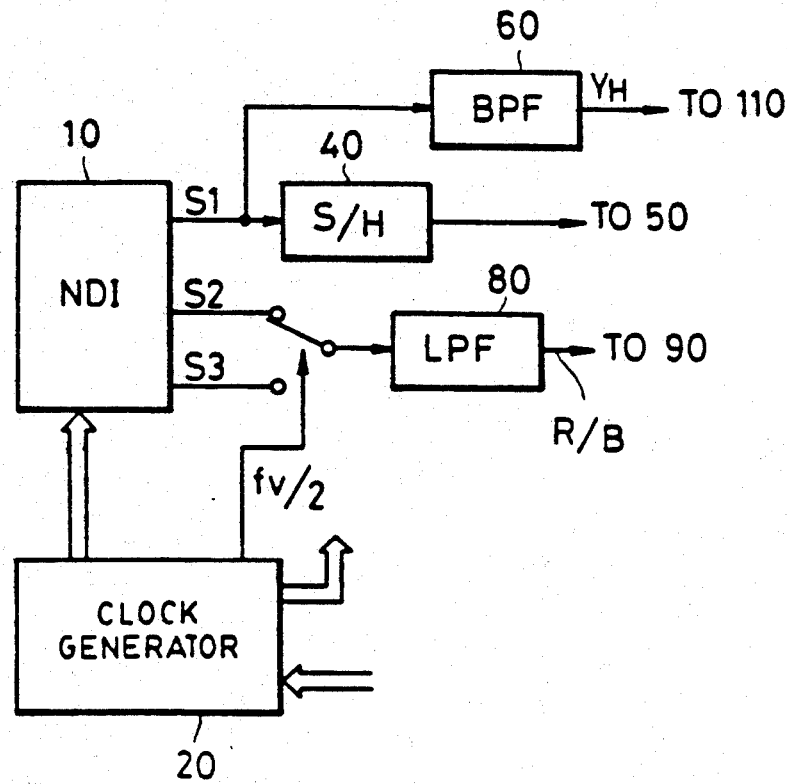
FIG. 12 is a block diagram of a signal processing circuit incorporated in the fifth embodiment shown in FIG. 11.

FIG. 12 is a block diagram of a signal processing circuit which is used in combination with the NDI shown in FIG. 11. It will be seen that color signals R and B are obtained in line sequence for each field, by switching the output of the NDI between S2 and S3. Thus, according to the fifth embodiment of the invention, it is possible to eliminate the necessity for the sample and hold circuit 70 shown in FIG. 4.

A description will be given below as to an example of application of the image pickup apparatus of the invention to a video camera. In the case of a video camera, color difference signals R−Y and B−Y have to be obtained simultaneously. Although these color difference signals are obtainable simultaneously using a suitable modification of the signal processing circuit of the fifth embodiment, a video camera, which is described as a sixth preferred embodiment of the image pickup apparatus of the present invention, incorporates a color separation filter shown in FIG. 13 which is suitable for use particularly in a video camera. FIG. 14 is a block diagram of a signal processing circuit suitable for use in combination with the color separation filter shown in FIG. 13.

Figure 13:
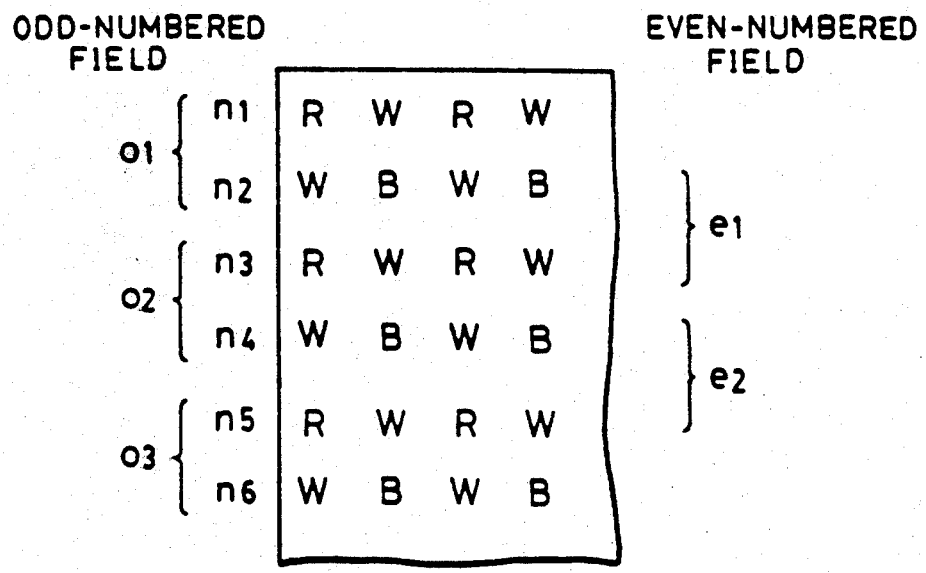
FIG. 13 is an illustration of filter elements in a color separation filter employed in a sixth embodiment of the image pickup apparatus of the present invention.
Figure 14:
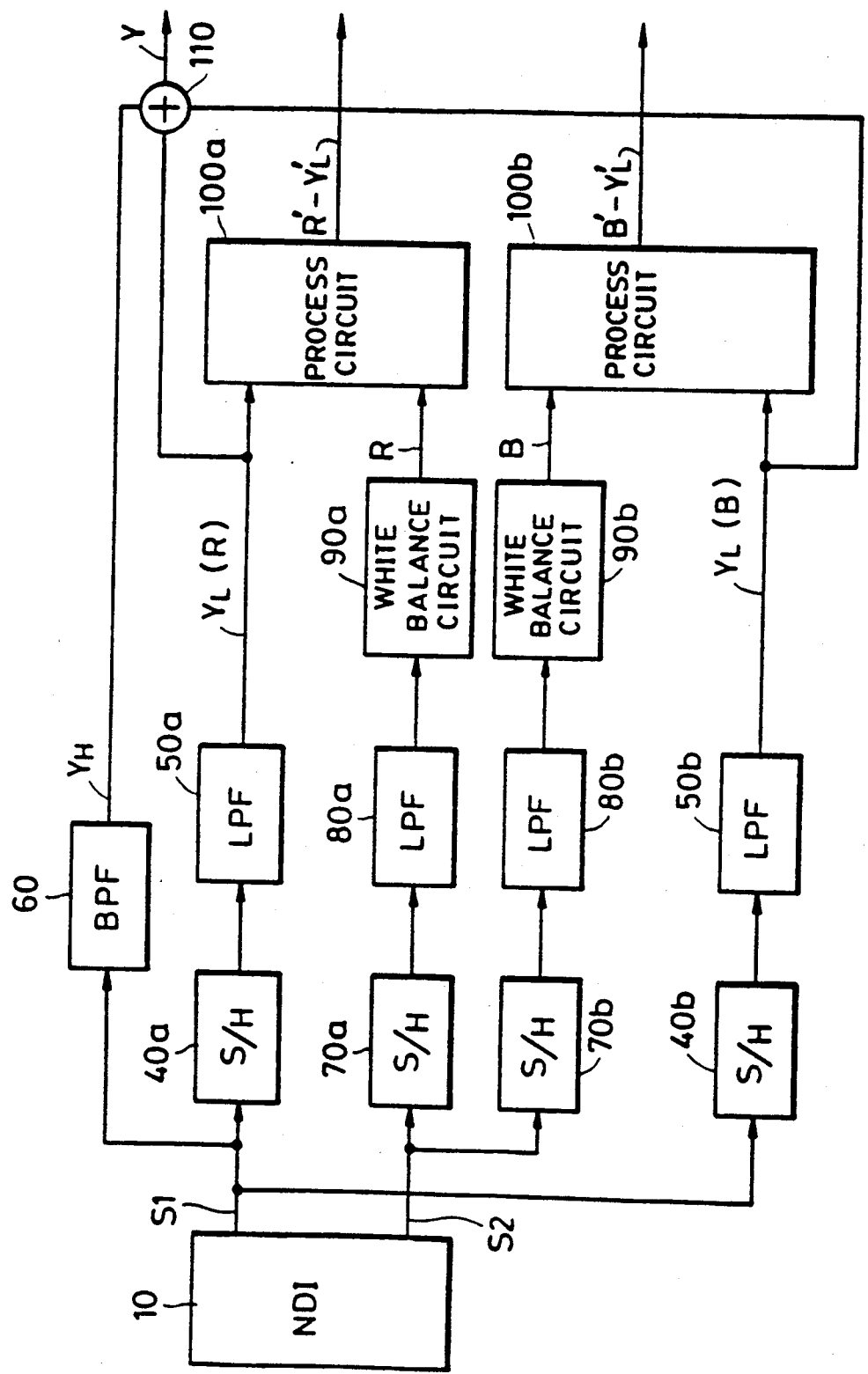
FIG. 14 is a block diagram of a signal processing circuit incorporated in the sixth embodiment.

The color separation filter shown in FIG. 13 has filter elements W arranged in a checkerboard pattern, and color filter elements R are arranged alternatingly with the filter elements W in the vertical direction. Similarly, the filter elements B are arranged alternatingly with the filter elements W in the vertical direction. As will be seen from FIG. 13, two color signals R and B exist in two adjacent horizontal lines which are read in scanning along each horizontal scanning line, regardless of whether the scanning line is for an odd-numbered field or an even-numbered field. It is, therefore, possible to obtain color difference signals from the color signals R and B and the luminance signal W which are derived from respective horizontal lines.

FIG. 14 shows an example of the signal processing circuit used in the sixth preferred embodiment. The internal wiring and driving method in the NDI 10 used in this embodiment are the same as those of the embodiment shown in FIG. 3. Thus, the signal W are continuously delivered from the output S1 of the ND1, while R and B dot sequential signals are alternatively derived from the output S2 of the NDI. In order to form both color difference signals from each horizontal line, sample and hold circuits 40b, 70b for the separation of the color signal and the low-band luminance signal, low-pass filters (LPF) 50b, 80b, a second white balance circuit 90b and a second process circuit 100b are added to the circuit shown in FIG. 4. The driving timings of the sample and hold circuits 40b and 70b are offset by 180° from the driving timings of the sample and hold circuits 40a and 70a. In addition, the operation timing of the sample and hold circuit 40a and the operation timing of the sample and hold circuit 70a are offset from each other by 180°.

Unlike the embodiment shown in FIG. 4, the sixth embodiment is constructed such that different color signals are derived from two different horizontal lines which are read simultaneously during scanning along a single horizontal scanning line, and white balancing control is conducted for each of these color signals.

In addition, each color difference signal is derived from a color signal and a low-band luminance signal which are derived from the same horizontal line, so that generation of false signals is suppressed.

In a seventh embodiment of the invention, the NDI shown in FIG. 11 is used in place of the NDI shown in FIG. 14. In this embodiment, since the color signals R and B are obtained independently, the sample and hold circuits 70a and 70b in FIG. 14 can be dispensed with.

Figure 15:
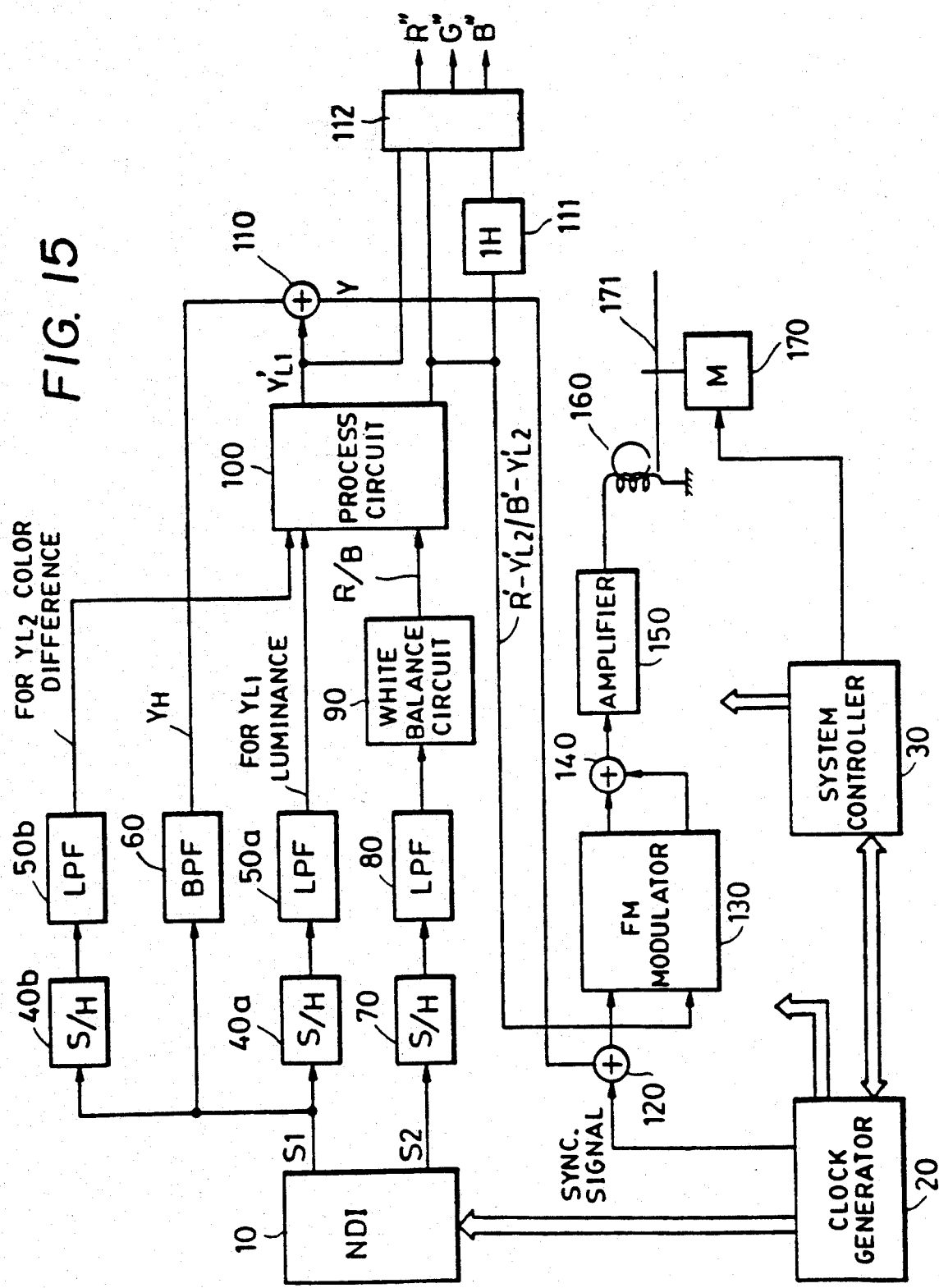
FIG. 15 is a block diagram of a signal processing circuit incorporated in an eighth embodiment of the image pickup apparatus of the present invention.
Figure 16:
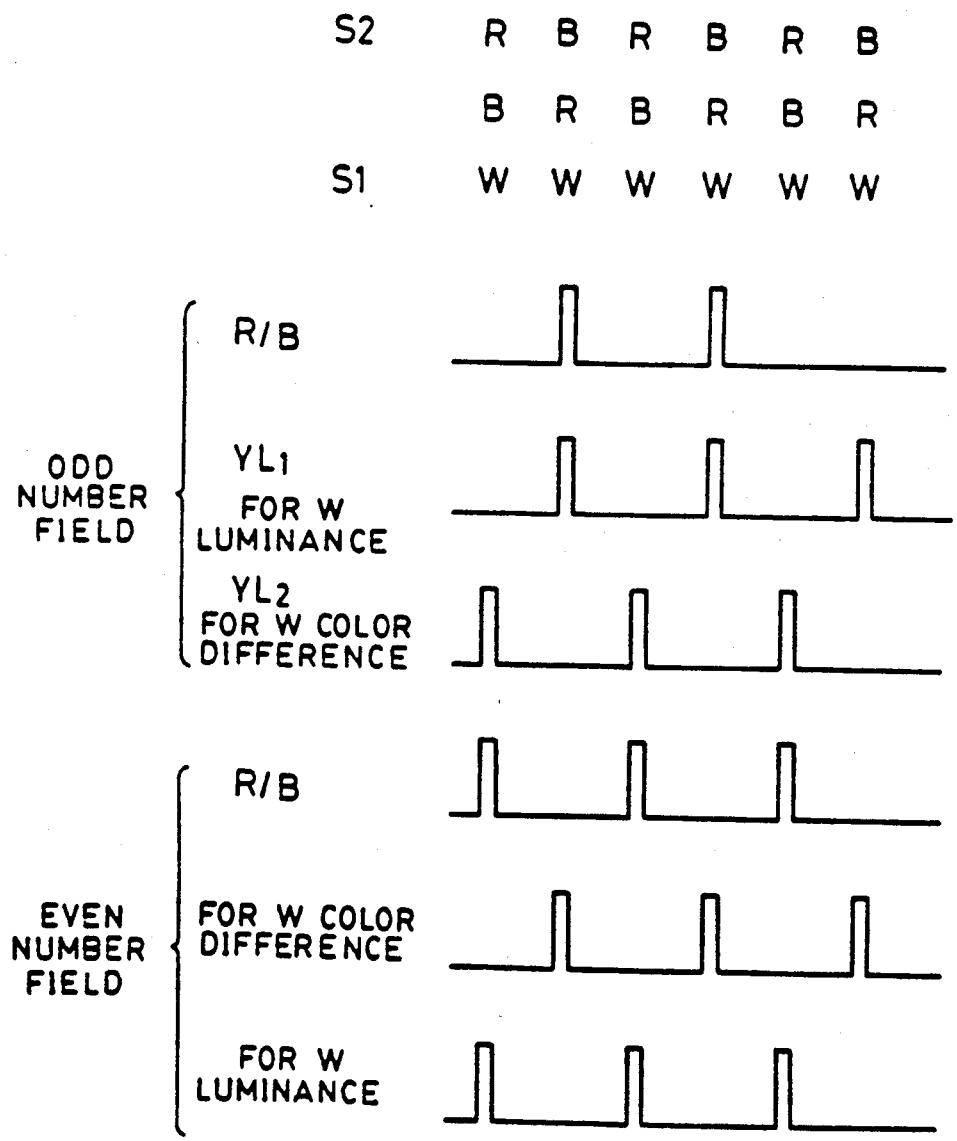
FIG. 16 is a waveform chart illustrating the sample timing in the eighth embodiment of the present inVention.

FIG. 15 is a block diagram of a signal processing circuit incorporated in the eighth embodiment of the invention, while FIG. 16 shows the driving timing of the eighth embodiment. In FIG. 15, the same reference numerals are used to denote the same constituent parts as those used in the circuit shown in FIG. 4. The NDI 10 incorporated in the circuit shown in FIG. 15 employs the same color separation filter as that shown in FIG. 2 and has a construction which is the same as that shown in FIG. 3. A quartz optical, low-pass filter is provided at the input side of the NDI 10, in order to slightly reduce the resolution in the vertical direction, thereby suppressing generation of moire, which will be mentioned later.

The circuit shown in FIG. 15 includes sample and hold circuits (S/H) 40a and 40b, low-pass filters (LPF) 50a and 50b, a 1 H delay circuit 111, and a matrix circuit 112.

In operation, as two adjacent horizontal lines are read simultaneously, the output terminal S1 of the NDI 10 produces the W signals in dot-sequential form from these two horizontal lines in alternation, while the output terminal S2 delivers alternatingly dot-sequential signals of R, B and dot-sequential signal of B, R for each horizontal scanning line. The luminance signal is formed from the W signal derived from the output terminal S1. More specifically, the output from the terminal S1 of the NDI is used as it is as the high-band luminance signal, thus attaining a band of a high resolution. More specifically, assuming that each horizontal line of picture elements in the NDI 10 contains 510 picture elements, the frequency of reading of the W signal from the terminal S1 is calculated to be about 9.5 MHz. Using this frequency as the Nyquist frequency, it is possible to utilize the band up to about 4.7 MHz as the luminance band. In such a case, the band-pass filter 60 has a band-pass characteristic of about 1 MHz to 4.7 MHz.

On the other hand, the low-band component $Y_{L1}$ for luminance and low-band component $Y_{L2}$ color difference and the color signals are separated at the output terminals S1 and S2 of the NDI by the sample and hold circuits 40a and 40b of different sample timings and by the sample hold circuit 70, respectively. More specifically, referring to FIG. 2, during the scanning along the horizontal scanning line o1 for odd-numbered fields, the color difference signal is formed from the W signal and B signal corresponding to the horizontal line n2. In the next scanning along the horizontal scanning line o2, the color difference signal is derived from the W signal and the R signal corresponding to the horizontal line n4.

Thus, during the scanning for the odd-numbered field, the low-band luminance signal is derived from the odd-numbered horizontal lines, while the color difference signal is derived from the even-numbered horizontal lines. Conversely, in the scanning for the even-numbered field, the low-band luminance signal is derived from the even-numbered horizontal line, while the color difference signal is derived from the odd-numbered horizontal lines. In addition, as shown in FIG. 16, the luminance signal $Y_{L2}$ for forming the color difference signal is separated by delaying the sampling time thereof from that of the low-band luminance signal $Y_{L1}$ for forming the luminance signal.

It will be seen that the vertical correlative distance between two interlacing groups of signals for different fields is so small that a high resolution is obtained in the vertical direction with regard to the low-band luminance signal $Y_L$ and the color component.

On the other hand, a remarkably high horizontal resolution is obtained in regard to the high-band luminance signal $Y_H$, because this signal is composed from the signals obtained from two horizontal lines.

The low-band luminance signal for the luminance, the low-band luminance for the color difference and the color signal thus obtained are introduced into the low-pass filters 50a, 50b and 80, so that their band widths are restricted to less than 1 MHz. The color signal is then delivered to the white balance circuit 90 in which a white balancing operation is conducted in accordance with a control voltage (not shown) which is controlled in accordance with the line sequence. The white-balanced line sequential color signals of R and B, the low-band luminance signal $Y_{L1}$ for luminance and the low-band luminance signal $Y_{L2}$ for the color difference are delivered to the process circuit 100 in which a conversion is conducted and, after a predetermined processing, a low-band luminance signal $Y_{L1}'$, and line sequential color difference signal $R'-Y_{L2}'$ or $B'-Y_{L2}'$ are output. The low-band luminance signal $Y_{L1}'$ is added to the high-band luminance signal $Y_H$ by the adder 110, so that a luminance signal Y is formed. The luminance signal Y is added to the synchronizing signal in the adder 120 and is delivered to the FM modulator 130 which also receives the line sequential color difference signal. The modulator 130 modulates these signals with different carriers and the modulated signals are added to each other by the adder 140 the output of which is delivered through the amplifier 150 and the head 160 so as to be recorded in the recording medium 171 by the head 160.

The line sequential signals $R'-Y_{L2}'$ and $B'-Y_{L2}'$ are delivered to the matrix circuit directly and indirectly through a 1 H delay circuit 111. The matrix circuit 112 receives also the low-band luminance signal $Y_{L1}'$ and performs the following operation, thereby forming color signals R", G" and B":

$$R'' = R' - Y_{L2}' + Y_{L1}' = R' + (Y_{L1}' - Y_{L2}')$$

$$B'' = B' - Y_{L2}' + Y_{L1}' + Y_{L1}' = B' + (Y_{L1}' - Y_{L2}')$$

$$G'' = Y_{L1}' - (R' - Y_{12}' + Y_{L1}') - (B' - Y_{L2}' + Y_{L1}') =$$

$$(Y_{L2}' - Y_{L1}') - R' - B'$$

As has been described, in this embodiment, due to the simultaneous processing of two horizontal lines and the specific arrangement of the filter elements, the high-band luminance signal is formed from two horizontal lines which are read in the same horizontal scanning. On the other hand, the low-band luminance signal is formed from the signals derived from one of these two horizontal lines, e.g., the upper one of the two horizontal lines which are read simultaneously, while the color difference signal is formed from the color signal and the W signal which are read from the other horizontal line, e.g., the lower one of these two horizontal lines.

Table 2 shows the recomposed color signals for respective horizontal scanning lines. The suffix attached to each symbol represents the horizontal line from which the signal has been derived

TABLE 2

| Scanning line | Luminance | Color-Dif. line seq. | Summing | Recomposed Signal | |
|---|---|---|---|---|---|
| | | | | R | B |
| o2 | $Y_3$ | $R_4 - Y_4$ | $B_2 - Y_2$ | $R_4 + (Y_3-Y_4)$ | $B_2 + (Y_3-Y_2)$ |
| o3 | $Y_5$ | $B_6 - Y_6$ | $R_4 - Y_4$ | $R_4 + (Y_5-Y_4)$ | $B_6 + (Y_5-Y_6)$ |
| o4 | $Y_7$ | $R_8 - Y_8$ | $B_6 - Y_6$ | $R_8 + (Y_7-Y_8)$ | $B_6 + (Y_7-Y_6)$ |

In operation, the color difference line sequential signals transmitted as shown in Table 2 are delayed by a time correspnding to the period of one horizontal scanning line, so as to be used in the recomposition of the color signals R and B. Each color signal thus recomposed involves a luminance error corresponding to one picture element. This error, however, is considerably smaller than the luminance error corresponding to two picture elements. In addition, it has been confirmed that the luminance error corresponding to one picture element can be appreciably reduced by the use of the vertical quartz low-pass filter.

As will be understood from the foregoing description, the eighth embodiment of the present invention offers various advantages such as high resolution due to the fact that the high-band luminance signal is derived from two horizontal lines, as well as reduced moire thanks to the small vertical correlative distance.

The vertical resolution also is improved because the low-band luminance signal is obtained from a single horizontal line. The color difference signal, which also is derived from a single horizontal line, involves only a very small false signal component. It is to be noted also that the color separation filter having the described filter elements is suitable for use in an electronic still camera, because the color difference line sequential signals are derived from the horizontal lines from which the low-band luminance signals, are obtained both for the even- and odd-numbered fields.

Figure 17:
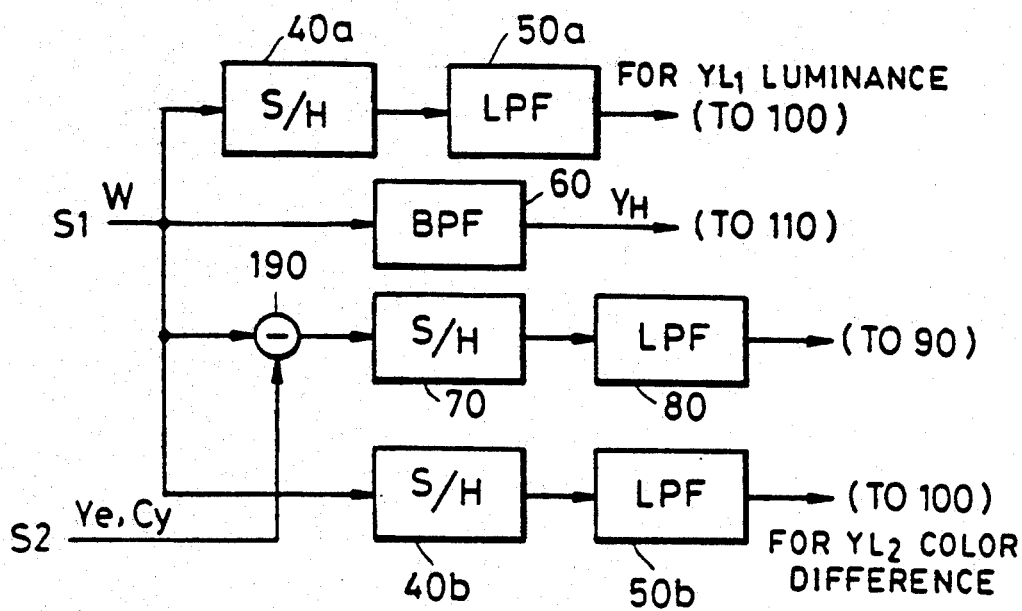
FIG. 17 is a block diagram of a signal processing circuit incorporated in a ninth embodiment of the present invention.

FIG. 17 is a block diagram of a signal processing circuit incorporated in the ninth embodiment of the invention. This embodiment employs the same color separation filter as that shown in FIG. 6a. The signal processing circuit has a construction substantially the same as that shown in FIG. 15, except that a subtractor 190 is added as shown in FIG. 17. In this embodiment, the high-band luminance signal $Y_H$, the low-band luminance signal $Y_{L1}$ for the luminance and the low-band luminance signal $Y_{L2}$ for the color difference are derived from the output line S1 of the NDI 10, as in the case of the embodiment shown in FIG. 15. However, the color signals R and B are obtained by subtracting the line sequential color signals Ye and Cy from the W signal derived from the output line S1.

This ninth embodiment offers the advantage that the transmittance is improved so as to ensure a high sensitivity as compared with the eighth embodiment, thanks to the use of the complementary color filter elements Ye and Cy. The use of the complementary color filter elements also improves the MTF (Modulation Transfer Function) in the vertical direction, so that the generation of moire is suppressed remarkably. In addition, the tendency of generation of false signal is reduced thanks to the reduced vertical correlative distance between the luminance components.

Figure 18:
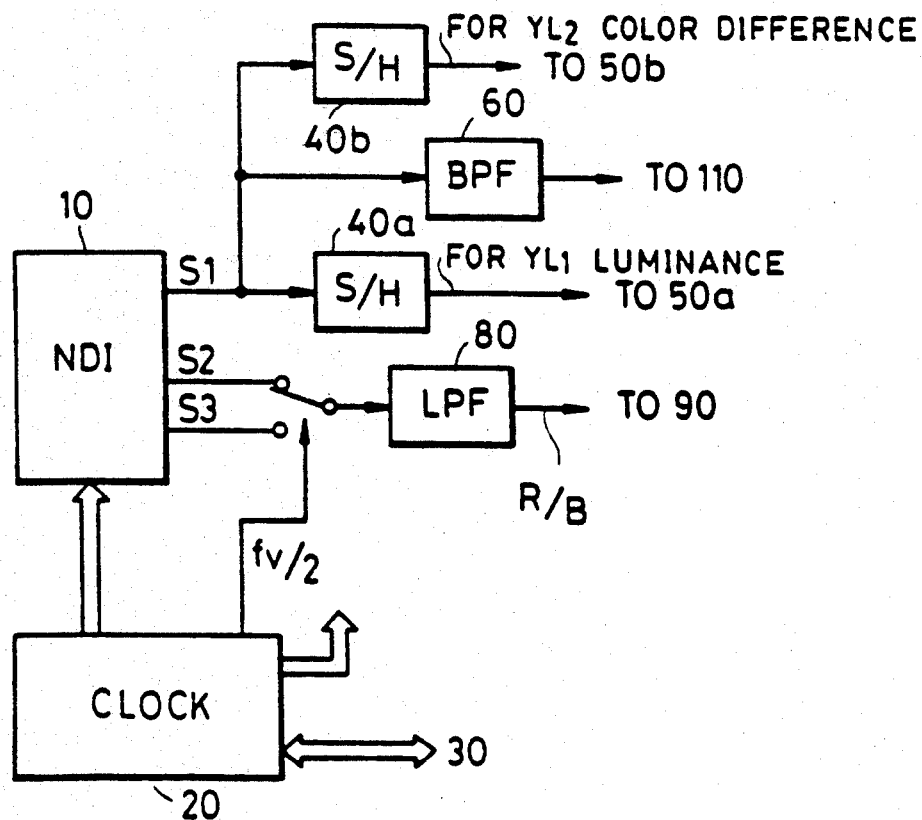
FIG. 18 is a block diagram of a signal processing circuit incorporated in a tenth embodiment of the image pickup apparatus of the present invention.

FIG. 18 schematically shows a signal processing circuit used in a tenth embodiment of the present invention which also employs an NDI which is the same as that shown in FIG. 11. Thus, in this NDI, separate output lines S2 and S3 are used for the color output signals for the odd numbered field and for the color output signals for the even-numbered field, respectively. The R signals and the B signals derived from two horizontal lines which are read simultaneously are separated such that the R signals are output from the output line S2, while the B signals are output from the output line S3. By switching the output line between S2 and S3 for successive fields, the color signals R and B are obtained in line sequence for the successive fields, thus eliminating the necessity of the sample and hold circuit 70.

Figure 19:
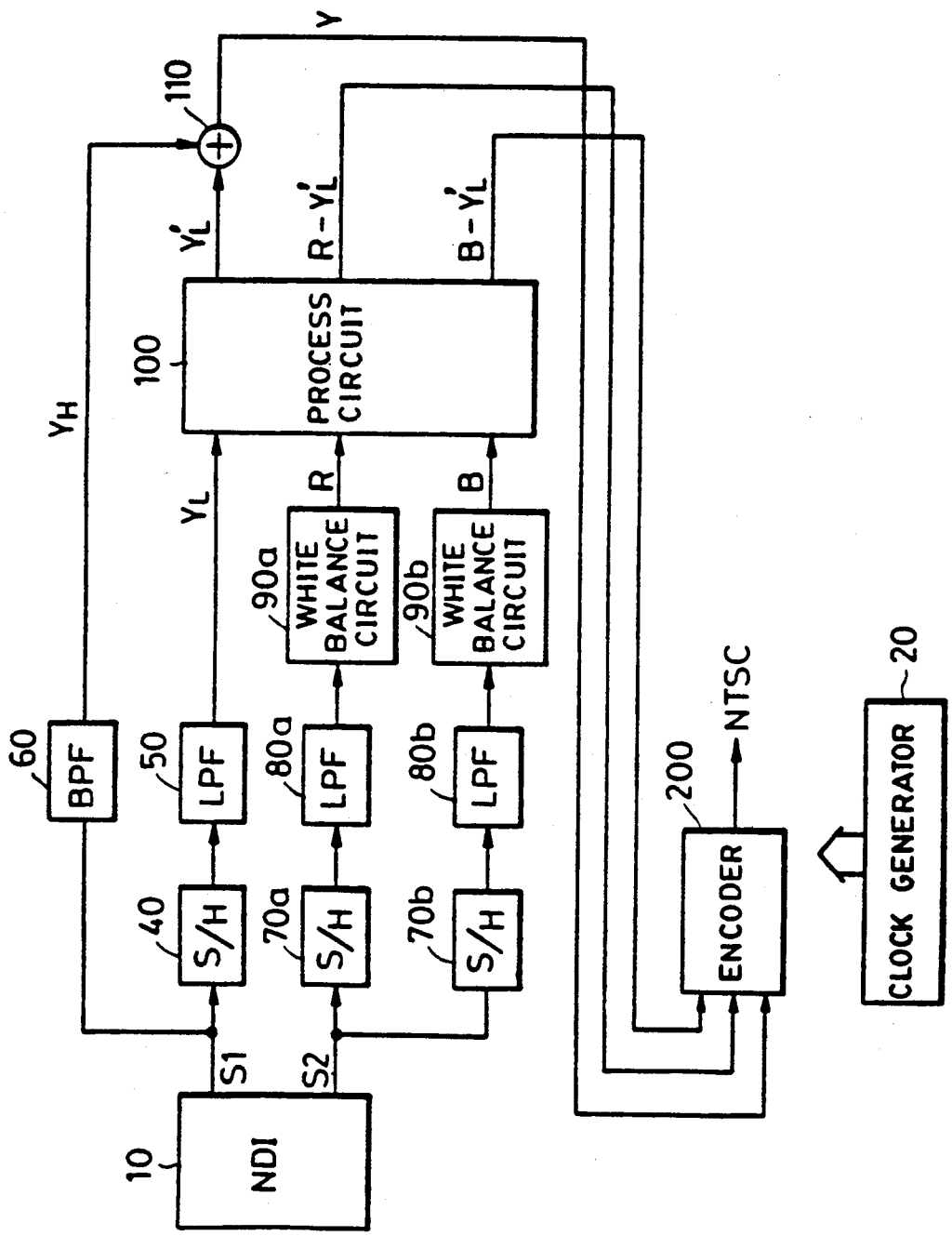
FIG. 19 is a block diagram of a signal processing circuit incorporated in an eleventh embodiment of the image pickup apparatus of the present invention.

FIG. 19 shows a signal processing circuit incorporated in the eleventh embodiment of the invention. This eleventh embodiment is an improvement in the arrangement shown in FIG. 14. Thus, in FIG. 19, the same reference numerals are used to denote the same parts as those appearing in FIGS. 1 to 14. A reference numeral 200 denotes an encoder.

This embodiment, therefore, makes use of the same color separation filter as that shown in FIG. 2. Thus, the luminance signal is formed from the W signals derived from both horizontal lines, while the color difference signal is formed from the color signals and W signals from each horizontal line. During the scanning for an odd-numbered field, the low-band components of the luminance signal and the color difference signal are derived from an odd-numbered horizontal line as the main horizontal line, whereas, during the scanning for an even-numbered field, those signals are read from an even-numbered horizontal line as the main horizontal line. The other of two horizontal lines which are read simultaneously in each scanning is therefore referred to as the "sub-horizontal line".

In operation, as two adjacent lines are read simultaneously, the W signals from the two horizontal lines are obtained alternatingly and in dot sequence at the output line S1 of the NDI 10, while the output line S2 delivers dot sequential signals R, B alternatingly. The luminance signal is formed from the output derived from the output line S1. More specifically, the output obtained at the output line S1 is used as it is as the high-band luminance signal, so that a band of a high resolution is attained as explained before. On the other hand, the low-band component for the, luminance, low-band component for the color difference and the color signal are separated at the output lines S1 and S2 of the NDI 10, by means of the sample and hold circuits 40, 70a and 70b.

Figure 20:
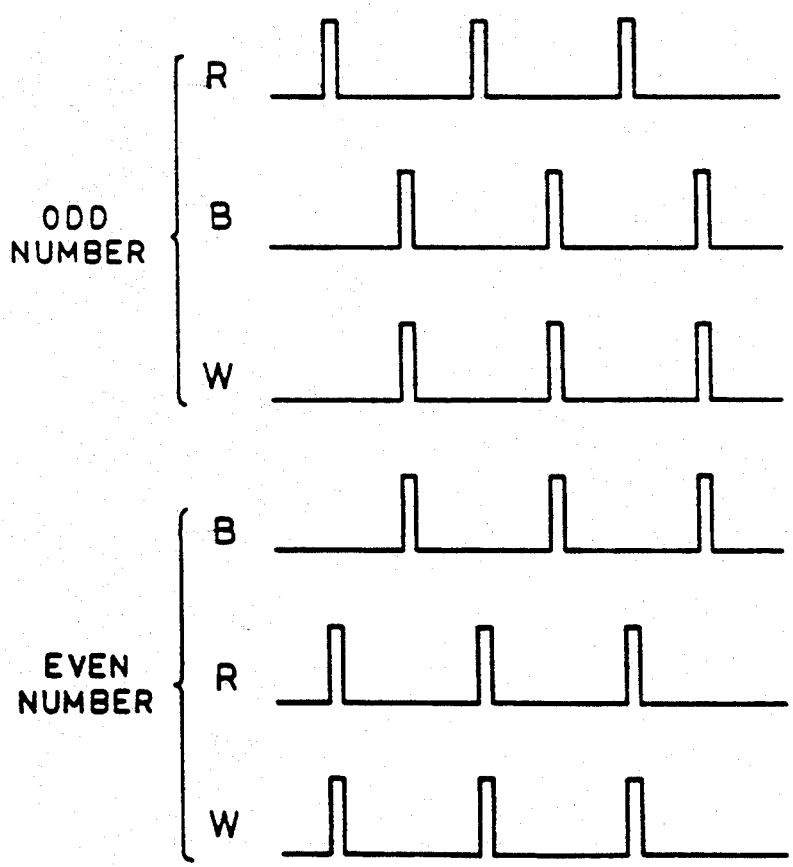
FIG. 20 is a sampling timing chart illustrating the sampling timing in the circuit shown in FIG. 19.

FIG. 20 shows the timing of sampling of the signals read by the sensor shown in FIG. 19. The dot sequential signals R,B obtained at the output line S2 are divided into discrete R and B signals at the illustrated timings. Meanwhile, the dot sequential signals W,W obtained at the output line S1 are divided such that, in an odd-numbered field, the W signal from the horizontal line including the R signal is separated, whereas, in the even-numbered field, the W signal from the horizontal line including the B signal is separated. The thus separated W signals are used as the low-band components of the luminance signal and the color difference signal.

This operation will be described in more detail with reference to FIG. 20. During the scanning along the horizontal scanning line o1 for forming an odd-numbered field, the W signals and R signals obtained from the horizontal line n1, as well as the W signals and B signals obtained from the horizontal line n2, are separated. At the same time, the low-band luminance signal is formed from the W signals derived from the horizontal line n1. In the next, horizontal scanning along the horizontal scanning o2, the W signals and the R signals derived from the horizontal line n3, as well as the W signals and B signals derived from the horizontal line n4, are separated. Meanwhile, the low-band luminance signal is formed from the W signals derived from the horizontal line n3. Thus, in the case an odd-numbered field, the low-band luminance signals are formed from odd-numbered horizontal lines, whereas, in the case of an even-numbered field, the low-band luminance signals are formed from signals derived from even-numbered horizontal lines This arrangement conveniently reduces the vertical correlative distance, thus preventing any degradation in the resolution in vertical direction.

The low-band luminance signals and the color signals thus obtained are supplied to the low-pass filters LPFs 50, 80a and 80b so that their bandwidths are restricted to about 1MHz. The color signals are further delivered to white balance circuits 90a and 90b in which white-balancing operations are conducted in accordance with control voltages (not shown) which are controlled in line sequential. The line sequential color signals of R and B and the low-band luminance signal $Y_L$ are delivered to the process circuit 100 in which processing is conducted, whereby a low-band luminance signal $Y_L'$ and line sequential color difference signals $R'-Y_L'$ and $B'-Y_L'$ are output. The low-band luminance signal $Y_L'$ is supplied to the adder 110 so as to be added to the high-band luminance signal $Y_H$, whereby the luminance signal Y is formed. The thus formed luminance signal is delivered to the encoder 200.

This arrangement ensures a high color reproducibility because the color signals are obtained through the primary color filter elements. Although an error corresponding to one picture element is present in the recomposed R and B signals, such a difference is negligibly small in view of the bandwidths of the color signals.

In addition, the luminance signal has a wide bandwidth because it is obtained through the summing of W signals derived from two horizontal lines.

Furthermore, since the same signal is used as the low-band components of the color difference signal and the luminance signal, the original primary color signals are recomposed without the risk of inclusion of false signal components attributable to the difference in the luminance.

It is to be noted also that the resolution in the vertical direction is not deteriorated because the low-band component of the luminance signal is derived from a single horizontal line.

Figure 21A:
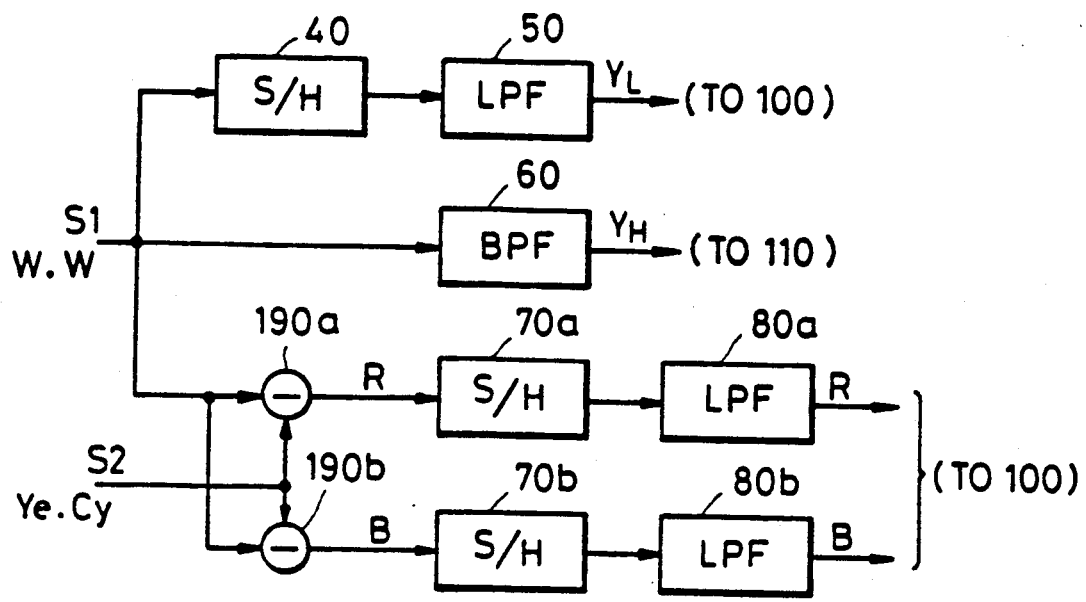
FIGS. 21(a), 21(b) and 21(c) illustrate a twelfth embodiment of the image pickup apparatus of the present invention.
Figure 21B:
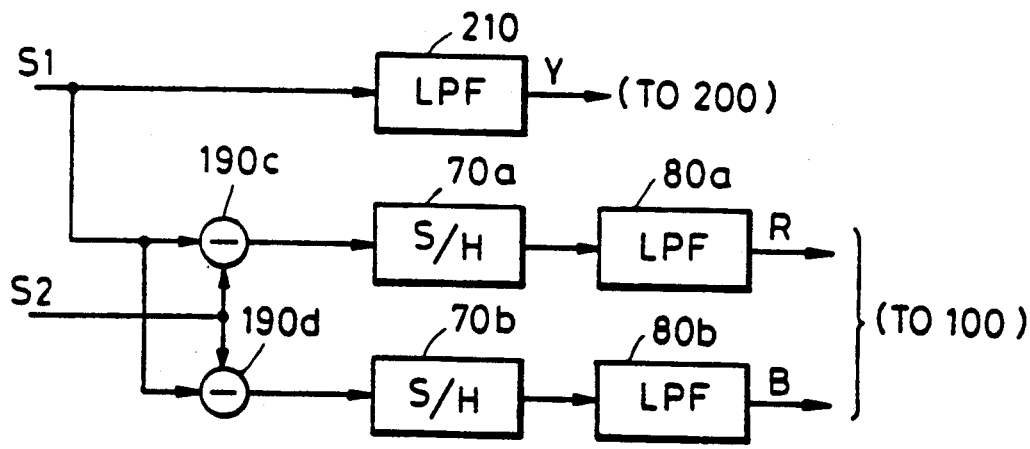
Figure 21C:
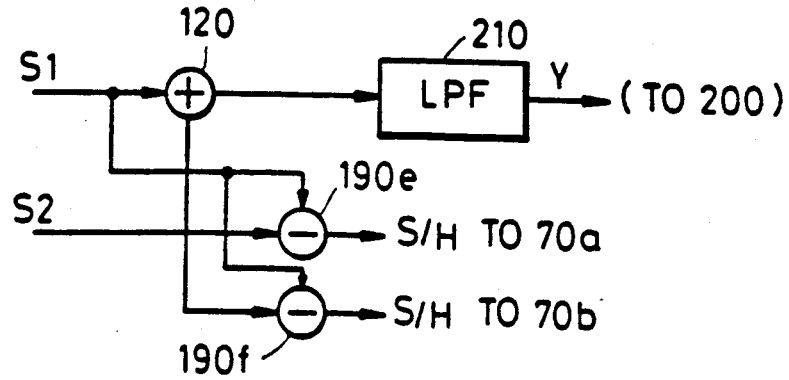

FIGS. 21(a) to 21(c) show examples of signal processing circuit employed in the twelfth embodiment of the image pickup apparatus of the invention. Either the color separation filter shown in FIG. 6(a) or the color separation filter shown in FIG. 6(b) is used in this embodiment.

When the filter shown in FIG. 6(a) is used, the B signal is obtained by subtracting the Ye signal from the W signal, while the R signal is obtained by substracting the Cy signal from the W signal. To these ends, the signal processsng circuit employs, as shown in FIGS. 21(a), 21(b) and 21(c), subtractors 190a to 190f in addition to the circuit elements shown in FIG. 15.

In the circuit shown in FIG. 21a, the high-band luminance signal $Y_H$ and the low-band luminance signal $Y_L$ are formed by the W signals derived from the output line S1 as in the case of the embodiment explained in connection with FIG. 15. In this embodiment, however, the color signals R and B are obtained by subtracting the line sequential color signals of Ye and Cy from the W signals derived from the output line S1. Numerals 70a and 70b denote sample and hold circuits, while numerals 80a and 80b denote low-pass filters.

The circuit shown in FIG. 21b is a modification in which, unlike the circuit shown in FIG. 21a, the luminance signal Y is formed by causing the output from the output line S1 to pass through a low-pass filter 210.

On the other hand, when the color separation filter shown in FIG. 6(b) is used in this embodiment, the R signal is obtained by subtracting the G signal from the Ye signal, whereas the B signal is formed by subtracting the G signal from the Cy signal. In this case, the processing circuit shown in FIG. 21b is suitably used, so that the subtracting operations for obtaining the R and B signals are conducted by subtractors 190c and 190d. The output from the output line S1 is directly used as the luminance signal. More specifically, Ye and Cy signals are obtained in dot sequential at the output line S1, while the G signals are obtained in dot sequential at the output line S2. The Ye and Cy signals are made to pass through low-pass filters 210, so that a signal Y approximated by $Ye+Cy=R+2G+B$ is formed.

When the circuit shown in FIG. 21(c) is used, the luminance signal is obtained as the sum of the signals derived from both output lines S1 and S2.

Figure 22:
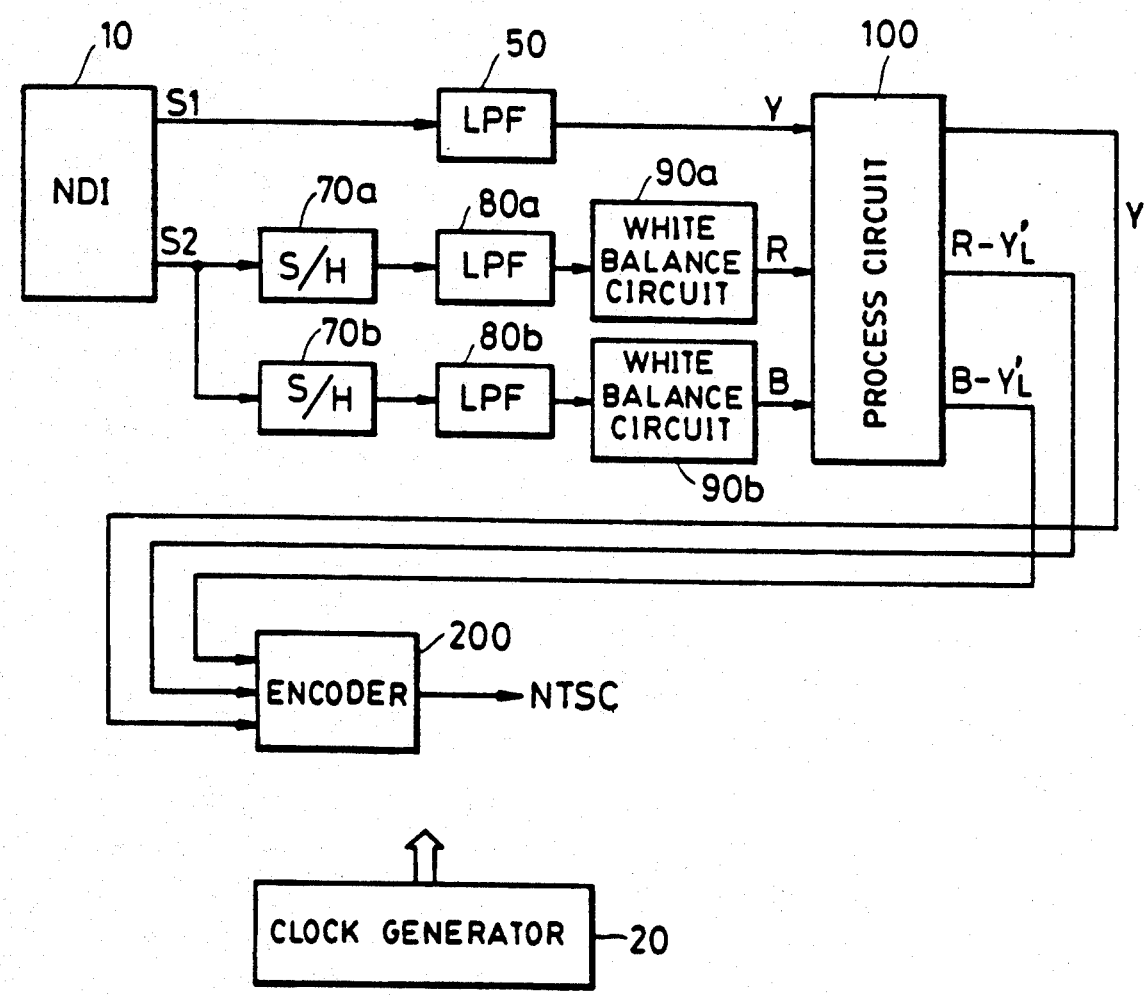
FIG. 22 is a block diagram of a modification of a signal processing circuit incorporated in the twelfth embodiment.

FIG. 22 shows a modification in which the output as the luminance signal, while dot sequential signals of R and B are obtained at the output line S2 of the NDI 10. Other portions are materially identical to those in FIG. 15.

According to the signal processing methods explained above, since the low-band components of the color difference signal and the luminance signal are constituted by the same signal, the original colors can be recomposed without any risk of inclusion of false signal components attributable to differences in the luminance.

In addition, the high-band luminance signal has a wide bandwidth because it is composed of the W signals derived from two horizontal lines. In addition, a high color reproducibility can be obtained because the color signals are obtained through primary color filter elements. Although the R and B color signals involve errors corresponding to one picture element, such errors are negligible in view of the bandwidths of these color signals.

Figure 23:
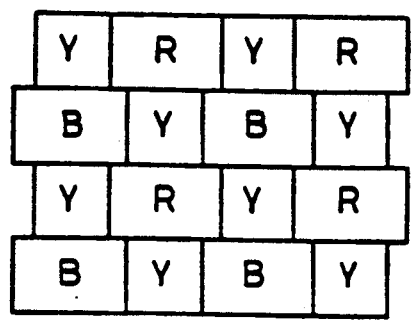
FIG. 23 is an illustration of the arrangement of picture elements in a solid-state image pickup device incorporated in a thirteenth embodiment of the image pickup apparatus of the present invention.

FIG. 23 shows a color separation filter suitable for use in the thirteenth embodiment of the invention. In this Figure, Y represents the filter elements or picture elements for obtaining complementary color signals for forming luminance signals, while R and B represent picture elements for obtaining primary color signals for forming color signals.

Figure 24:
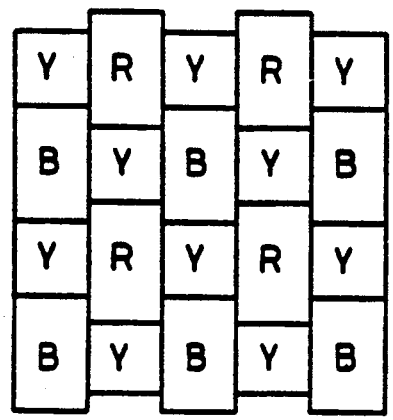
FIG. 24 is an illustration of arrangement of picture elements in a solid-state image pickup device incorporated in a fourteenth embodiment of the image pickup apparatus of the present invention.

It will be seen that the picture elements for color signals have a length greater than that of the picture elements for luminance signals in the horizontal direction. Thus, the primary color picture elements have an area greater than that of the complementary color picture elements, so that the sensitivity of the primary color picture elements is reduced as compared with that of the complementary color picture elements FIG. 24 shows the fourteenth embodiment of the present invention in which the picture elements for the color signals and the picture elements for the luminance signals have different lengths in the vertical direction, so that the primary color picture elements have a greater size and, hence, a smaller sensitivity, than the complementary color picture elements.

In the thirteenth and fourteenth embodiments described above, the picture elements for the color signals and the picture elements for the luminance signals are arranged such that they appear in alternating lines, i.e., at a pitch corresponding to two picture elements, both in the horizontal and vertical directions, whereby a constant pitch of centroids of the spatial sampling is obtained In the thirteenth and fourteenth embodiments described above, the picture elements for primary colors have a size greater than that of the picture elements for complementary colors, so that the solid-state image pickup device can have widened dynamic range and enhanced sensitivity.

Figure 25:
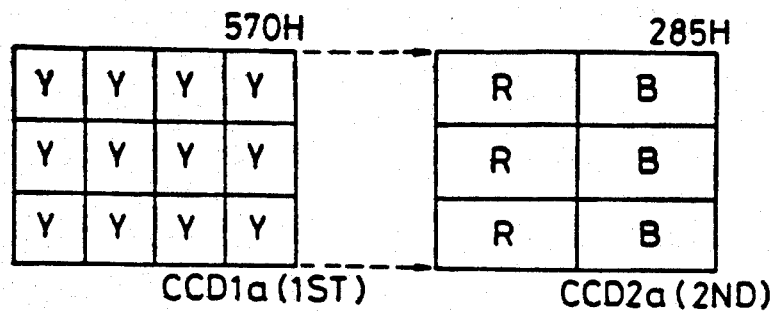
FIG. 25 shows arrangement of an image pickup device and a filter in a fifteenth embodiment of the image pickup apparatus of the invention.

FIG. 25 shows the arrangement of a sensor and a color separation filter which are used in the fifteenth embodiment of the invention. The sensor has a first sensor CCD 1a having a color separation filter composed of numerous total-color transmitting filter elements Y arranged on a matrix of picture elements The matrix has a plurality of horizontal lines each containing 570 picture elements. The second sensor CCD 2a has a color separation filter which includes filter elements R for transmitting red color and filter elements B for transmitting blue color. The number of picture elements in the horizontal line constituting the matrix in the CCD 2a is 285 which is half that of the sensor CCD 1a. Therefore, the sensor CCD 1a produces a luminance signal having a bandwidth of, for example, 5.4 MHz, while the sensor CCD 2a produces, for example, a color signal of a bandwidth of, for example, about 1MHz.

Figure 26:
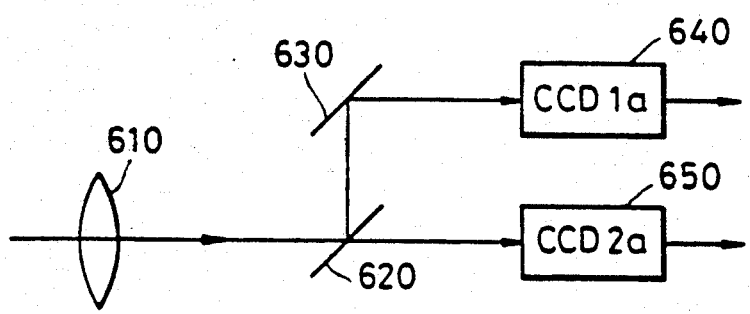
FIG. 26 is a schematic illustration of an optical system.

FIG. 26 schematically shows an optical system of an image pickup apparatus. The optical system has an image pickup lens 610, a half mirror 630, a total-reflection mirror 630, a sensor CCD 640 correspnding to the CCD 1a shown in FIG. 24, and a sensor CCD 650 corresponding to the CCD 2a shown in FIG. 24. Assuming here that the half mirror 620 has a transmittance of 50%, the CCD 1a exhibits a sensitivity which is higher than that of the CCD 2a by an amount corresponding to the difference in the size of the picture elements. Actually, however, the S/N value of the CCD 1a and the S/N value of the CCD 2a can be regarded as being materially the same, considering that the CCD 1a transmits all colors while the CCD 2a transmits only red and blue.

Figure 27:
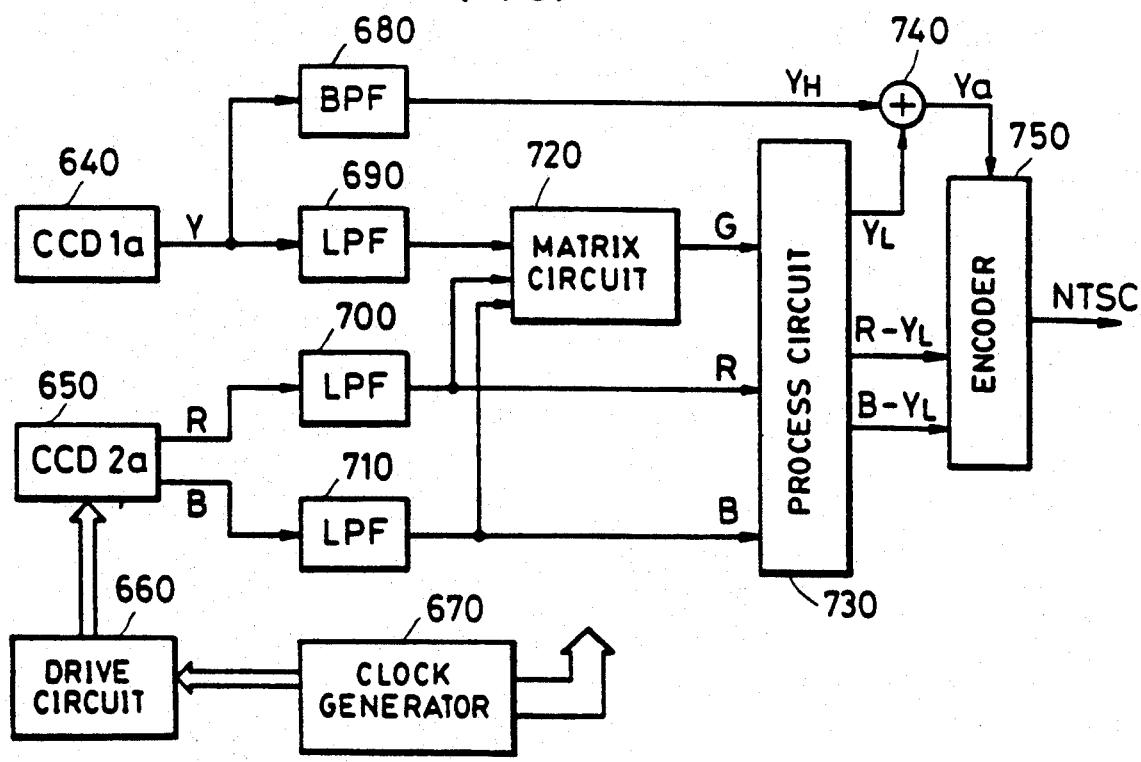
FIG. 27 is a block diagram of a signal processing circuit for processing signals derived from the optical system shown in FIG. 26.

FIG. 27 is a block diagram of a circuit for processing the signals derived from the device shown in FIG. 25. This signal processing circuit includes a drive circuit 660 for driving respective image pickup devices, a clock generator 670, a band-pass filter (BPF) 680, low-pass filters (LPF) 90, 700 and 710, a matrix circuit 720, a process circuit 30, an adder 740, and an encoder 750.

The matrix circuit 720 receives the luminance signal Y from the low-pass filter 690, a color signal R from the low-pass filter 700 and the color signal B from the low-pass filter 710. Upon receipt of these signals, the matrix circuit 720 performs such a matrix operation as to subtract the color signals R and B from the luminance signal Y, thereby generating a color signal G. The color signals R,G and B are delivered to the process circuit 730 which operates to form a low-band luminance signal $Y_L$ from these signals. The thus formed low-band luminance signal $Y_L$ is delivered to the adder 740 which also receives the high-band luminance signal $Y_H$ coming from the CCD 1a through the band-pass filter 680, so that the low- and high-band luminance signals are added to each other, thus forming a luminance signal Ya of NTSC.

Figure 28:
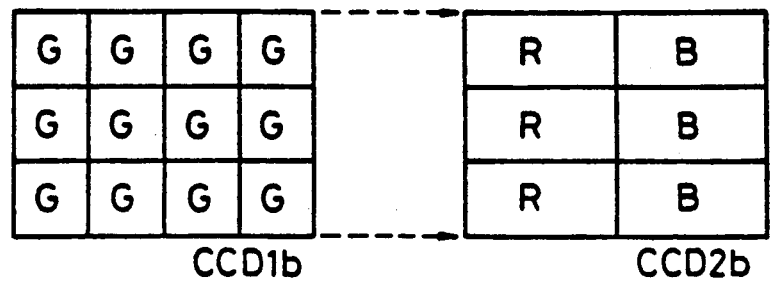
FIGS. 28, 29 and 30 are illustrations of arrangements of image pickup devices and color separation filters in different embodiments of the present invention.
Figure 29:
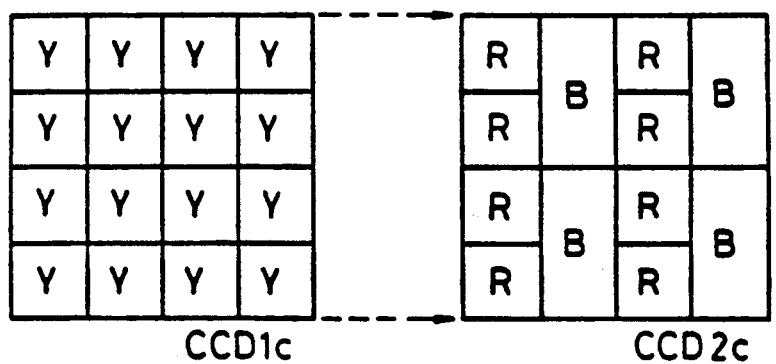
Figure 30:
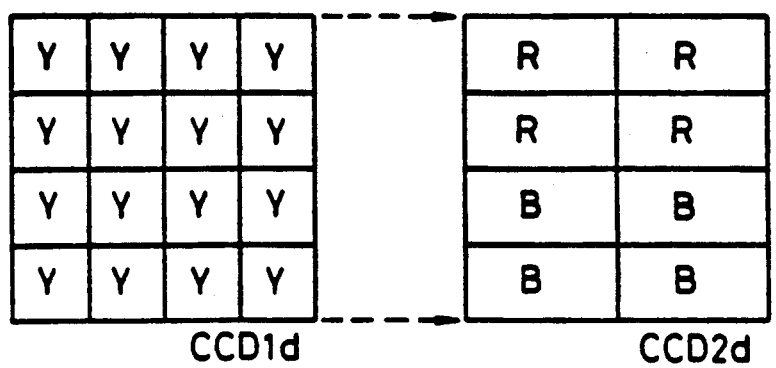

FIGS. 28, 29 and 30 show arrangements of the sensor and the color separation filter in different embodiments of the present invention. In the embodiment shown in FIG. 28, assuming that the half mirror 620 reflects and transmits, respectively, 67% and 33% of the incident light, almost the same level of sensitivity is obtained for the G, R and B signals In this system, a higher sensitivity is obtainable if a prism is used in the optical system, but the use of the optical system shown in FIG. 26, employing the half mirror 620, is preferred because of the simple construction. It is to be noted also that this embodiment does not necessitate the use of the matrix circuit 720 in the signal processing circuit. Namely, the luminance component of the high band is obtained by making use of the G signal which in turn is obtained from the R and B signals.

The embodiment shown in FIG. 29 employs a different construction of the CCD 2a from that used in the embodiment shown in FIGS. 25 and 26. Namely, in this case, the number of the picture elements B is reduced in the vertical direction. This arrangement is a practical one which makes use of the fact that the spectral sensitivity of human eyes does not require high resolution specifically for the color signal B.

In the embodiment shown in FIG. 30, the picture elements of each CCD are arranged such that horizontal lines of picture elements are formed. This arrangement, therefore, can be applied to a color-difference line-sequential recording system which makes use of horizontal scanning.

Thus, in the embodiments shown in FIGS. 25 to 30, the sensitivity of the camera is not degraded even when the construction of the optical system is simplified. In addition, it is possible to lower the cost through the reduction in the number of the CCDs used. The reduced number of CCDs also enables the horizontal transfer frequency to be reduced, as well as the electric power consumption.

What is claimed is:

1. A multi-plate type image pickup apparatus comprising:
    a solid-state image pickup device for producing color signals comprising a plurality of picture elements; and
    a solid-state image pickup device for producing luminance signals comprising a plurality of picture elements,
    wherein the size of at least one of said plurality of picture elements of said solid-state image pickup device for producing color signals is greater than that of each of said plurality of picture elements of said solid-state image pickup device for producing luminance signals, and wherein a green filter is arranged in front of at least one of said plurality of picture elements for producing luminance signals.

2. A multi-plate type image pickup apparatus according to claim 1, wherein the size of at least one of said plurality of picture elements of said solid-state image pickup device for producing color signals is substantially two times larger than that of each of said plurality of picture elements of said solid-state image pick-up device for producing luminance signals.

3. A multi-plate type image pickup apparatus according to claim 1, wherein at least one of said plurality of picture elements for producing color signals is longer than each of said plurality of picture elements for producing luminance signals, in the horizontal direction.

4. A multi-plate type image pickup apparatus according to claim 3, wherein at least one of said plurality of picture elements for producing color signals is substantially two times longer than each of said plurality of picture elements for producing luminance signals.

5. A multi-plate type image pickup apparatus according to claim 1, wherein filter of different colors are arranged in a two line sequence in said solid-state image pickup device for producing color signals.

6. A multi-plate image pickup apparatus comprising:
a solid-state image pickup device for producing color signals comprising a plurality of picture elements; and
a solid-state image pickup device for producing luminance signals comprising a plurality of picture elements, wherein the size of at least one of said plurality of picture elements of said solid-state image pickup device for producing color signals is greater than that of each of said plurality of picture elements of said solid-state image pickup device for producing luminance signals, and wherein a colorless filter is arranged in front of at least one of said plurality of picture elements for producing luminance signals.

7. A multi-plate type image pickup apparatus according to claim 6, wherein the size of at least one of said plurality of picture elements of said solid-state image pickup device for producing color signals is substantially two time larger than that of each of said plurality of picture elements of said solid-state image pick-up device for producing luminance signals.

8. A multi-plate type image pickup apparatus according to claim 6, wherein at least one of said plurality of picture elements for producing color signals is longer than each of said plurality of picture elements for producing luminance signals, in the horizontal direction.

9. A multi-plate type image pickup apparatus according to claim 8, wherein at least one of said plurality of picture elements for producing color signals is substantially two times longer than each of said plurality of picture elements for producing luminance signals.

10. A multi-plate type image pickup apparatus according to claim 6, wherein filter of different colors are arranged in a two line sequence in said solid-state image pickup device for producing color signals.

* * * * *

UNITED STATES PATENT AND TRADEMARK OFFICE
CERTIFICATE OF CORRECTION

PATENT NO. : 5,018,006
DATED : May 21, 1991
INVENTOR(S) : SEIJI HASHIMOTO

It is certified that error appears in the above-identified patent and that said Letters Patent is hereby corrected as shown below:

Title page,

IN [62] RELATED U.S. APPLICATION DATA

Insert: --Continuation of Ser. No. 920,777, Oct. 20, 1986, abandoned.--.

COLUMN 1

Line 42, "scanning" should read --scanning.--.

COLUMN 2

Line 45, "involves" should read --involve--.

COLUMN 4

Line 55, "which," should read --which--.

COLUMN 6

Line 18, "illustration-of" should read --illustration of--.
Line 52, "inVen-" should read --inven- --.

COLUMN 8

Line 67, "from" should read --form--.

COLUMN 10

Line 51, "substracting" should read --subtracting--.

UNITED STATES PATENT AND TRADEMARK OFFICE
CERTIFICATE OF CORRECTION

PATENT NO. : 5,018,006
DATED : May 21, 1991
INVENTOR(S) : SEIJI HASHIMOTO

It is certified that error appears in the above-identified patent and that said Letters Patent is hereby corrected as shown below:

COLUMN 11

Line 47, "$\phi RS_2$" should read --$\phi RS2$--.

COLUMN 12

Line 55, "are" should read --is--.

COLUMN 13

Line 41, "signal" should read --signals--.

COLUMN 14

Line 18, "signal $Y_L$" should read --signal $Y_{L1}$--.

COLUMN 15

Line 13, "derived" should read --derived.--.
    Line 25, "correspnding" should read --corresponding--.
    Line 50, "signals," should read --signals--.

COLUMN 16

Line 58, "the," should read --the--.

COLUMN 17

Line 14, "next," should read --next--.
    Line 15, "scanning o2," should read --scanning line o2,--.
    Line 20, "an" should read --of an--.
    Line 25, "lines" should read --lines.--.

UNITED STATES PATENT AND TRADEMARK OFFICE
CERTIFICATE OF CORRECTION

PATENT NO. : 5,018,006
DATED : May 21, 1991
INVENTOR(S) : SEIJI HASHIMOTO

It is certified that error appears in the above-identified patent and that said Letters Patent is hereby corrected as shown below:

COLUMN 18

Line 5, "substracting" should read --subtracting--.
    Line 7, "processng" should read --processing--.
    Line 37, "filters 210," should read --filter 210,--.
    Line 42, "output as" should read --output derived from the output line S1 of the NDI is directly used as--.

COLUMN 19

Line 10, "elements" should read --elements.--.
    Line 25, "obtained" should read --obtained.--.
    Line 37, "elements" should read --elements.--.
    Line 51, "mirror 630," should read --mirror 620,--.

COLUMN 20

Line 1, "(LPF) 90," should read --(LPF) 690,--.
    Line 2, "circuit 30," should read --circuit 730,--.
    Line 25, "signals" should read --signals.--.

COLUMN 21

Line 27, "filter" should read --filters--.
    Line 30, "multi-plate image pickup apparatus" should read --multi-plate type image pickup apparatus--.

UNITED STATES PATENT AND TRADEMARK OFFICE
CERTIFICATE OF CORRECTION

PATENT NO. : 5,018,006

DATED : May 21, 1991

INVENTOR(S) : SEIJI HASHIMOTO

It is certified that error appears in the above-identified patent and that said Letters Patent is hereby corrected as shown below:

COLUMN 22

Line 17, "time" should read --times--.
Line 31, "filter" should read --filters--.

Signed and Sealed this

Twentieth Day of April, 1993

Attest:

MICHAEL K. KIRK

*Attesting Officer*   Acting Commissioner of Patents and Trademarks